US012090491B2

(12) United States Patent
Roth

(10) Patent No.: US 12,090,491 B2
(45) **Date of Patent: *Sep. 17, 2024**

(54) CENTRIFUGAL SEPARATORS AND SEPARATION METHODS PROVIDING INTERMEDIATE MATERIAL EJECTION CONTROL

(71) Applicant: Empirical Innovations, Inc., Dakota Dunes, SD (US)

(72) Inventor: Nicholas A. Roth, Dakota Dunes, SD (US)

(73) Assignee: Empirical Innovations, Inc., Dakota Dunes, SD (US)

( * ) Notice: Subject to any disclaimer, the term of this patent is extended or adjusted under 35 U.S.C. 154(b) by 726 days.

This patent is subject to a terminal disclaimer.

(21) Appl. No.: 17/316,370

(22) Filed: May 10, 2021

(65) Prior Publication Data

US 2021/0260606 A1 Aug. 26, 2021

Related U.S. Application Data

(63) Continuation of application No. 16/877,466, filed on May 18, 2020, now Pat. No. 11,000,859, which is a (Continued)

(51) Int. Cl.

*B04B 11/04* (2006.01)
*B04B 1/14* (2006.01)
*B04B 1/18* (2006.01)

(52) U.S. Cl.

CPC ................ *B04B 11/04* (2013.01); *B04B 1/14* (2013.01); *B04B 1/18* (2013.01)

(58) Field of Classification Search

CPC .. B04B 11/04; B04B 1/14; B04B 1/10; B04B 1/16; B04B 1/18

See application file for complete search history.

(56) References Cited

U.S. PATENT DOCUMENTS 2,179,941 A 11/1939 Lindren
2,478,992 A 8/1949 Wheelright
(Continued)

FOREIGN PATENT DOCUMENTS

CN 112221721 B 10/2022
DE 102005021331 A1 11/2006
(Continued)

*Primary Examiner* — Charles Cooley
(74) *Attorney, Agent, or Firm* — The Culbertson Group, P.C.; Russell D. Culbertson

(57) ABSTRACT

A separator includes a drum ejection passage control element and an intermediate ejection control element both mounted on a drum assembly. The drum ejection passage control element is moveable between a first position and a second position. In the second position a drum ejection passage is open for ejection of material from a maximum diameter of a separator volume, while in the first position the drum ejection passage control element blocks the drum ejection passage to prevent the ejection of material from the maximum diameter of the separator volume. An intermediate ejection path is formed in the separator, each extending from an intermediate ejection path inlet at an intermediate region of the separator volume to an intermediate ejection path outlet. The intermediate ejection control element is moveable to alternately open or close the intermediate ejection path for fluid communication to the separator volume.

20 Claims, 17 Drawing Sheets

Related U.S. Application Data continuation of application No. 16/418,815, filed on May 21, 2019, now Pat. No. 10,654,050.

(56) References Cited

U.S. PATENT DOCUMENTS 2,485,209 A 10/1949 Lundal
2,973,896 A 3/1961 Peltzer
3,085,743 A 4/1963 Steinacker
3,189,267 A 6/1965 Thylefors
3,494,546 A 2/1970 Nilson
3,550,843 A * 12/1970 Walter ...................... B04B 1/18 494/27
3,749,303 A * 7/1973 Hemfort ................... B04B 1/18 494/10
3,750,940 A 8/1973 Nilsson
3,752,389 A 8/1973 Nilsson
3,990,632 A 11/1976 Hemfort
4,015,773 A 4/1977 Thylefors
4,026,462 A 5/1977 Tenthoff
4,044,945 A * 8/1977 Kohlstette ................. B04B 1/18 494/27
4,083,488 A 4/1978 Gunnewig
4,164,317 A 8/1979 Nelson
4,284,233 A * 8/1981 Kulker ...................... B04B 1/14 494/27
4,410,319 A * 10/1983 Zettier ...................... B04B 1/14 494/29
4,498,897 A * 2/1985 Gunnewig ................ B04B 1/18 494/27
4,505,700 A * 3/1985 Zettier ...................... B04B 1/14 494/30
4,525,155 A 6/1985 Nilsson
4,643,708 A * 2/1987 Stroucken ................. B04B 1/14 494/40
4,670,005 A * 6/1987 Kohlstette ................. B04B 1/14 494/27
4,717,376 A * 1/1988 Bruning .................... B04B 1/14 494/29
4,781,670 A * 11/1988 Kohlstette ................. B04B 1/14 494/27
4,925,442 A * 5/1990 Bodelson .................. B04B 1/14 494/27
4,966,576 A 10/1990 Schulz
5,405,307 A 4/1995 Borgstrom
5,944,649 A * 8/1999 Karlsson ................... B04B 1/14 210/139
6,358,193 B1 * 3/2002 Nyberg ................ B03D 1/1418 494/10
6,969,343 B2 11/2005 Mackel
8,557,316 B2 10/2013 Pecoroni
9,561,513 B2 * 2/2017 Mackel ..................... B04B 1/14
10,654,050 B1 * 5/2020 Roth ......................... B04B 1/14
11,000,859 B2 * 5/2021 Roth ......................... B04B 1/14
2020/0368764 A1 11/2020 Roth
2021/0260606 A1 * 8/2021 Roth ......................... B04B 1/14

FOREIGN PATENT DOCUMENTS

EP 3666391 A1 6/2020
EP 4008437 A1 6/2022
EP 4101543 A1 12/2022
GB 853733 A 11/1960
GB 1221630 A 2/1971
GB 2114472 B 5/1985
GB 2253799 B 11/1994
WO 2008087039 A1 7/2008
WO 2017153150 A1 9/2017

* cited by examiner

CENTRIFUGAL SEPARATORS AND SEPARATION METHODS PROVIDING INTERMEDIATE MATERIAL EJECTION CONTROL

CROSS-REFERENCE TO RELATED APPLICATIONS

Applicant claims the benefit, under 35 U.S.C. § 120, of U.S. patent application Ser. No. 16/877,466 filed May 18, 2020, and entitled "DRUM AND EJECTION CONTROL ARRANGEMENTS FOR CENTRIFUGAL SEPARATORS AND SEPARATION METHODS EMPLOYING MULTIPLE PISTONS TO CONTROL SEPARATE INTERMITTENT EJECTION OF HEAVY AND INTERMEDIATE MATERIAL" (as amended), now U.S. Pat. No. 11,000,859, and of U.S. patent application Ser. No. 16/418,815 filed May 21, 2019, and entitled "CENTRIFUGAL SEPARATORS AND SEPARATION METHODS EMPLOYING MULTIPLE PISTONS AND FACILITATING INTERMEDIATE MATERIAL EJECTION" (as amended), now U.S. Pat. No. 10,654,050. The entire content of each of these prior patent applications and patents is incorporated herein by this reference.

TECHNICAL FIELD OF THE INVENTION

The invention relates to centrifugal separators employing a rapidly spinning drum which may be opened periodically to eject higher density materials which have been separated from a feed material. The invention also encompasses methods for operating such centrifugal separators.

BACKGROUND OF THE INVENTION

Some centrifugal separator designs employ a drum assembly which is spun at high speeds about a vertical rotational axis to cause the separation of constituents of different densities included in a feed stream introduced into the separator. In these designs, the drum assembly is spun about a vertical rotational axis as a feed stream is continuously introduced into a drum assembly volume defined by the drum assembly. Centrifugal force imparted on the feed stream by the rotation of the drum assembly causes higher-density constituents in the feed stream to collect at a maximum diameter region of the separator volume while lower-density constituents are displaced inwardly toward the axis of rotation. The lower-density constituents may exit the drum assembly volume via a lower-density material outlet at or near the axis of rotation at the top of the drum assembly volume. Higher-density material collecting in the region of maximum diameter within the drum assembly volume is ejected in a non-continuous fashion by periodically opening ejection passages formed in the drum assembly about the circumference of the drum assembly volume at the maximum diameter. A sliding piston mounted within the drum assembly volume is controlled to selectively open and close the drum ejection passages.

Among centrifugal separators of the type described in the previous paragraph there are generally two different methods used to remove the lower-density constituents from the drum assembly volume. In centrifugal separators commonly referred to as "non-hermetically sealed" separators, a centripetal pump may be used to pump collected lower-density material out of the drum assembly volume. In centrifugal separators commonly referred to as "hermetically sealed" separators, feed material is directed into the drum assembly volume so as to displace separated lower-density material without the need for a pumping element within the drum assembly volume. In either hermetically sealed or non-hermetically sealed centrifugal separators, the feed material may be introduced from the top of the drum assembly or from the bottom of the drum assembly.

In addition to removing higher-density constituents and lower-density constituents from a feed material, it may be desirable to also remove intermediate-density material which may collect radially inwardly from the higher-density material. For example, the intermediate-density material collecting radially inwardly of where the higher-density material collects may represent a product that is desirable to recover from the feed stream. In other cases, it may be desirable to remove the intermediate-density material from the drum assembly volume because the material interferes with the separation of the higher-density constituents of the feed stream from the lower-density constituents. In particular, the physical properties of the intermediate density material may be such that the material forms a barrier through which the higher-density material has difficulty passing even under the centrifugal force imparted by the rotation of the drum assembly.

This intermediate-density material may be removed by simply leaving the drum ejection passages open for a period of time longer than needed to eject the higher-density material. However, leaving the drum ejection passages open longer runs the risk of ejecting lower-density materials along with the higher-density materials and any intermediate-density materials. It may also be desirable to eject the intermediate-density material to facilitate separation but not eject the higher-density material.

In addition to or in lieu of periodically opened ejection passages, some centrifugal separators include specially sized orifices spaced apart at different angular orientations about the drum assembly axis of rotation. These orifices are continuously open to the drum assembly volume and are positioned and sized to allow collected material to exit the drum assembly volume at a desired rate.

Although such continuously open orifices may be used to eject intermediate-density material collecting at an intermediate region within the drum assembly volume, such orifices are difficult to size and position in practice so as to achieve the desired result. If the orifices are too large, excessive lower-density material will be ejected and thereby decrease the performance of the centrifugal separator. If the orifices are too small, intermediate-density material may continue to collect to interfere with the operation of the separator. Also, because the particular radius within the drum assembly volume where intermediate-density material may collect is somewhat dependent on the nature of the feed material, it is difficult to position orifices within the separator volume to remove all of the intermediate-density material in the operation of the centrifugal separator.

U.S. Pat. No. 9,561,513 shows a centrifugal separator having an arrangement for separating an input stream into a solid constituent, a heavy liquid phase, and a light liquid phase. The solid in this separator is ejected through ejection passages at the maximum diameter of the drum assembly volume, while the light liquid phase is removed via a centripetal pump as described above. The heavy liquid phase in the separator shown in U.S. Pat. No. 9,561,513 is removed through a channel that runs from an entry point at a location in the drum assembly volume inside the maximum diameter and then inwardly toward the center of rotation of the drum assembly. However, this arrangement requires that the heavy phase liquid move radially inwardly against the centrifugal force applied to the material in operation. This requirement that the heavy liquid phase move inwardly against the centrifugal force of the separator leaves the channel subject to plugging, which may be more or less severe depending upon the nature of the heavy liquid phase being separated.

SUMMARY OF THE INVENTION

It is an object of the invention to provide centrifugal separators and components thereof, and processes of operating a centrifugal separator which overcome the above-described deficiencies and others. In particular, it is an object of the present invention to provide apparatus and methods for allowing an intermediate material to be periodically ejected from an intermediate region of a separator volume included in a separator drum assembly volume.

A centrifugal separator (which may be referred to herein for expediency as a "separator") according to a first aspect of the invention includes a drum assembly and ejection control elements. The drum assembly defines a separator rotational axis and is mountable on a suitable structure for rotation about that axis. The drum assembly may include a drum base connected to a drum cover to define a drum assembly volume. At least a portion of this drum assembly volume represents the separator volume which is in fluid communication with a feed inlet through which a feed material is introduced into the apparatus for separation. The separator volume represents that portion of the drum assembly volume in which feed material collects and is separated under centrifugal force into different separable components. Regardless of how the drum assembly is formed, a drum ejection passage is included in the drum assembly extending from a drum ejection passage inlet to a drum ejection passage outlet which may be open to an area outside of the separator volume. "Open to" in this sense, and as used elsewhere in this disclosure and the accompanying claims, means "in fluid communication with." Thus the arrangement in which the drum ejection passage outlet is "open to" an area outside of the separator volume means that the drum ejection passage outlet is in fluid communication with the area outside the separator volume.

The ejection control elements according to this first aspect of the invention include a drum ejection passage control element and an intermediate ejection control element each mounted on the drum assembly. The drum ejection passage control element is mounted on the drum assembly so as to be moveable along a range of movement between a first drum ejection passage control position and a second drum ejection passage control position. In the first drum ejection passage control position the drum ejection control element is positioned relative to a respective drum ejection passage to define a first flow area through the drum ejection passage from the separator volume to an area outside the separator volume. However, in the second drum ejection passage control position the drum ejection passage control element is positioned relative to the respective drum ejection passage to define a second flow area through the drum ejection passage greater than the first flow area through the drum ejection passage. Thus in this second drum ejection passage control position, the drum ejection passage is open to the separator volume to allow material to be ejected from the separator volume.

Drum assemblies according to this first aspect of the invention also include an intermediate ejection path extending from an intermediate ejection path inlet to an intermediate ejection path outlet. The intermediate ejection path inlet is located at radial distance from the separator rotational axis less than the radial distance of the drum ejection passage inlet from the separator rotational axis.

The intermediate ejection control element is also mounted on the drum assembly and is moveable along a range of movement between a first intermediate ejection control position and a second intermediate ejection control position. In the first intermediate ejection control position, the intermediate ejection control element is positioned relative to the intermediate ejection path to define a first flow area through the intermediate ejection path. In the second intermediate ejection control position, the intermediate ejection control element is positioned relative to the intermediate ejection path to define a second flow area through the intermediate ejection path greater than the first flow area through the intermediate ejection path. Thus in this second intermediate ejection control position, the intermediate ejection path is open to the separator volume to allow material to be ejected from an intermediate area of the separator volume radially inward from the maximum diameter of the separator volume.

A separator including a drum assembly and ejection control elements according to this first aspect of the invention further includes a first control arrangement and a second control arrangement. The first control arrangement is operable to control the position of the drum ejection passage control element along the range of movement of that element. The second control arrangement is operable to control the position of the intermediate ejection control element along the range of movement for that element.

An apparatus according to this first aspect of the present invention has the advantage that the intermediate ejection path provides an ejection route directly from the intermediate region of the separator volume radially inside of the maximum diameter of the separator volume. It is in this intermediate region of the separator volume where an intermediate-density material may collect and interfere with the collection and discharge of higher-density materials to be separated from a feed stream to the separator. Thus the ability to open the intermediate ejection path to the separator volume by moving the intermediate ejection control element to the second intermediate ejection control position allows any such intermediate-density material to be ejected periodically to prevent or reduce any adverse effects of the collection of that material or to recover the intermediate material should recovery of that material be desirable. This ejection of material from the intermediate region of the separator volume may be performed without having to open the drum ejection passage to the separator volume at the maximum diameter of that volume and therefore may be performed independently of ejecting the higher-density material collecting in that maximum diameter region.

In some implementations of an apparatus according to the first aspect of the invention, the intermediate ejection path is defined entirely through the drum assembly. In other implementations, however, the intermediate ejection path is defined at least in part by the drum ejection passage and a middle ejection passage formed in the drum ejection passage control element. In these implementations the middle ejection passage has a middle passage inlet at an inside surface of the drum ejection passage control element and a middle passage outlet at an outside surface of that control element. The middle passage outlet at least partially aligns with the drum ejection passage at least when the drum ejection passage control element is in the first drum ejection control position to provide a continuous flow path through respective middle ejection passage and drum ejection passage.

An apparatus according to the first aspect of the invention may be implemented so that an upper lateral surface of the intermediate ejection control element resides below at least some of the middle passage inlet of the middle ejection passage when the intermediate ejection control element is in the second position for that control element. In this arrangement with the surface of the intermediate ejection control element at least partially displaced from the inlet of the middle ejection passage, the inlet is exposed to the separator volume by virtue of residing at least partially above the upper lateral surface of the intermediate ejection control element when that control element is in its second position.

An apparatus according to the first aspect of the invention may include an inner ejection passage formed in the intermediate ejection control element. The inner ejection passage defines an inner ejection inlet at an inside surface of the intermediate ejection control element and defines an inner ejection outlet at an outside surface of that control element. The inner ejection outlet of the inner ejection passage is positioned to at least partially align with the middle passage inlet of the middle ejection passage when the intermediate ejection control element is in its second position. In this arrangement, the middle passage inlet is exposed to the separator volume through the inner ejection passage when the intermediate ejection control element is in its second position to allow material collected in the region of the inner ejection inlet to be ejected from the separator volume through the inner ejection passage and middle ejection passage.

The intermediate ejection control element may include a set of two or more inner ejection passages. That is, the intermediate ejection control element may include a set of inner ejection passages comprising a first inner ejection passage as defined in the previous paragraph and one or more additional inner ejection passages. Each of the inner ejection passages of the set of inner ejection passages in these implementations define a respective inner ejection passage inlet at an inside surface of the intermediate ejection control element and define a respective inner ejection passage outlet at an outside surface of that control element. In these implementations the intermediate ejection control element range of movement encompasses a respective additional open position corresponding to each inner ejection passage in the set of two or more inner ejection passages beyond the first inner ejection passage. The inner ejection passage outlet of the first inner ejection passage of the set of inner ejection passages at least partially aligns with the middle passage inlet when the intermediate ejection control element is in its second position so as to expose respective middle passage inlet to the separator volume through the first inner ejection passage. The inner ejection passage outlet of a respective inner ejection passage in the set of inner ejection passages beyond the first inner ejection passage likewise at least partially aligns with the middle passage inlet when the intermediate ejection control element is in a respective additional position corresponding to that inner ejection passage. This arrangement of a set of two or more inner ejection passages in the intermediate ejection control element provides different routes for ejection of intermediate materials from the intermediate region of the separator volume. By placing each inner ejection passage of the set of such passages at a different angle through the intermediate ejection control element in a plane perpendicular to the separator rotational axis, the inlet of each inner ejection passage in the set may be at a different respective radius of the intermediate region of the separator volume. The angles selected may be such that all of the inner ejection passages slope in the same way with respect to the separator rotational axis or slope in opposite directions. In any case, the different inner ejection passage angles allow materials collecting at different parts of the separator volume intermediate region to be ejected by positioning the intermediate ejection control element appropriately to align a desired one the inner ejection passages with the middle ejection passage.

Implementations of an apparatus according to the first aspect of the invention may include passages to allow the introduction of a positioning fluid into and out of an intermediate ejection control element positioning chamber to facilitate moving the intermediate ejection control element along its range of movement. These passages may include at least one intermediate ejection control element positioning chamber fill passage in the drum ejection passage control element and at least one intermediate ejection control positioning chamber release passage in the drum ejection passage control element. The intermediate ejection control element control arrangement may include an intermediate ejection control element control valve in fluid communication with the intermediate ejection control element positioning chamber release passage in order to control the release of fluid from the intermediate ejection control element positioning chamber and thereby control the position of the intermediate ejection control element along its range of movement.

Another aspect of the invention includes methods of ejecting material from a centrifugal separator having a drum assembly mounted for rotation about a separator rotational axis. Methods according to this second aspect of the invention include rotating a drum assembly and control elements as described above at a separator velocity about the separator rotational axis. While rotating the drum assembly and control elements at the separator velocity, methods according to this second aspect of the invention include moving the intermediate ejection control element from its first position to its second position to unblock intermediate ejection path so that the path provides fluid communication from the separator volume to an area outside the separator volume. Thus opening the intermediate ejection path allows material to be ejected from the intermediate region within the separator volume under the centrifugal force of the rotation. Once the desired material has been ejected, the method includes returning the intermediate ejection control element to its first position while rotating the drum assembly.

Methods according to this second aspect of the invention may include maintaining the drum ejection passage control element in its first position while moving the intermediate ejection control element to and from the intermediate ejection control element second (open) position, all while rotating the drum assembly at a separator velocity. Methods according to this second aspect of the invention may also include moving the drum ejection passage control element from its first position to its second position and then back to the first position again while maintaining the intermediate ejection control element in the first (closed) position for that control element.

In implementations of the separator including inner ejection passages extending through the intermediate ejection control element and a middle ejection passage extending through the drum ejection passage control element, moving the intermediate ejection control element from its first position to its second position may include moving the intermediate ejection control element so that the desired inner ejection passage forms part of the intermediate ejection path.

In methods according to the second aspect of the invention, moving the intermediate ejection control element from its first position to its second position may include releasing a positioning fluid for the intermediate ejection control element through a fluid release passage through the drum ejection passage control element. These methods may further include releasing the positioning fluid through an intermediate ejection control element control valve in fluid communication with the fluid release passage. Returning the intermediate ejection control element from its second to first position may include directing a positioning fluid through a fill passage through the drum ejection passage control element.

These and other advantages and features of the invention will be apparent from the following description of representative embodiments, considered along with the accompanying drawings.

DESCRIPTION OF REPRESENTATIVE EMBODIMENTS

In the following description FIGS. 1-7 will be referenced to describe a first separator embodying principles according to the present invention. FIGS. 8-13 will be referenced to describe an alternative separator embodying principles of the present invention. FIGS. 14-17 will be referenced to describe additional variations which may be included in separators within the scope of the present invention. It should be borne in mind, however, that the specific example separators shown in the figures are provided merely as examples of separators and separator components encompassing the above-described aspects of the invention and falling within the scope of the following claims. Numerous variations are possible on these example separators, and, while many of these variations will be noted specifically in the following description, additional variations lie within the scope of the following claims.

Figure 1:
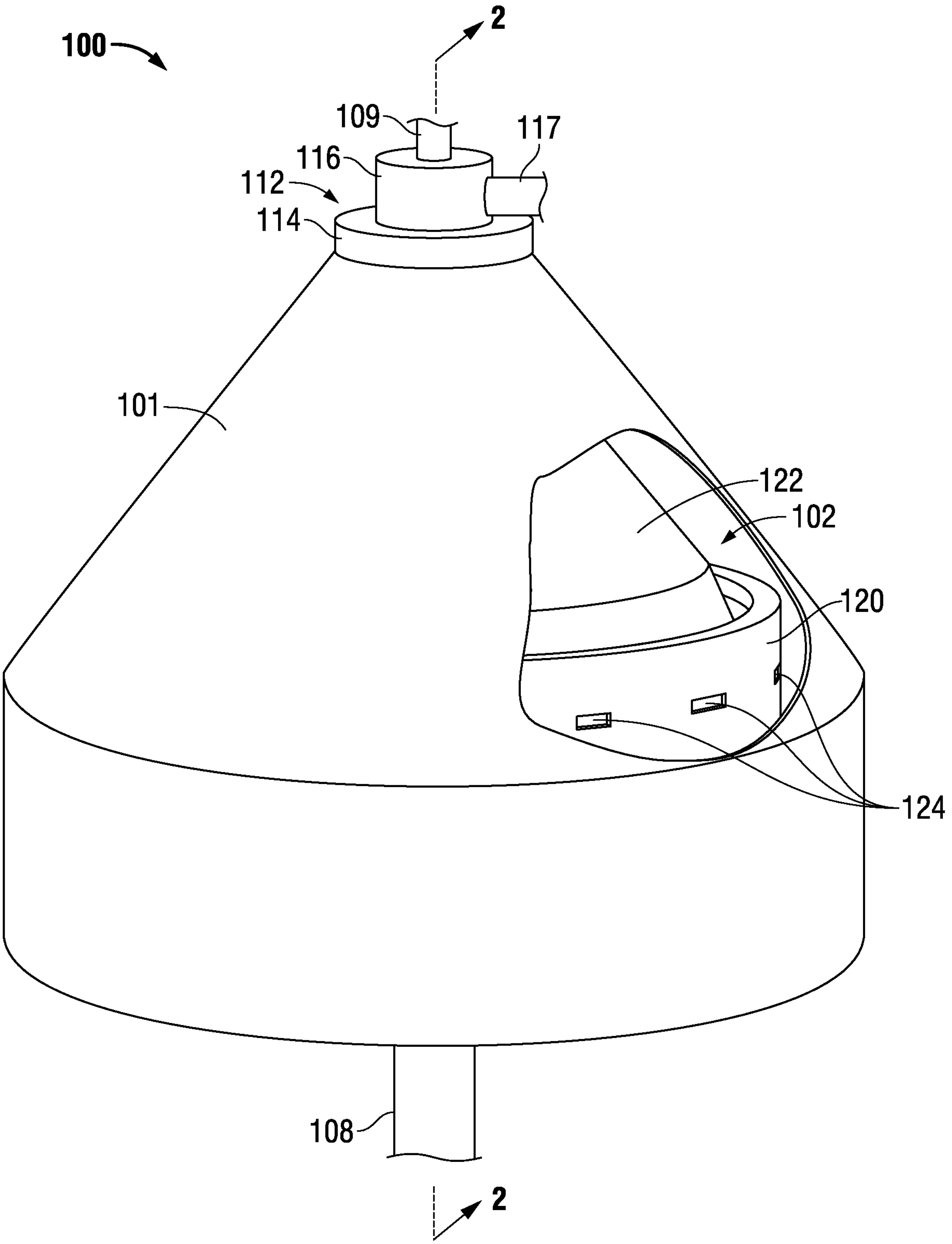
FIG. 1 is a view in perspective of a separator embodying principles according to the present invention, with the housing partially broken away to show a portion of the drum assembly within.
Figure 2:
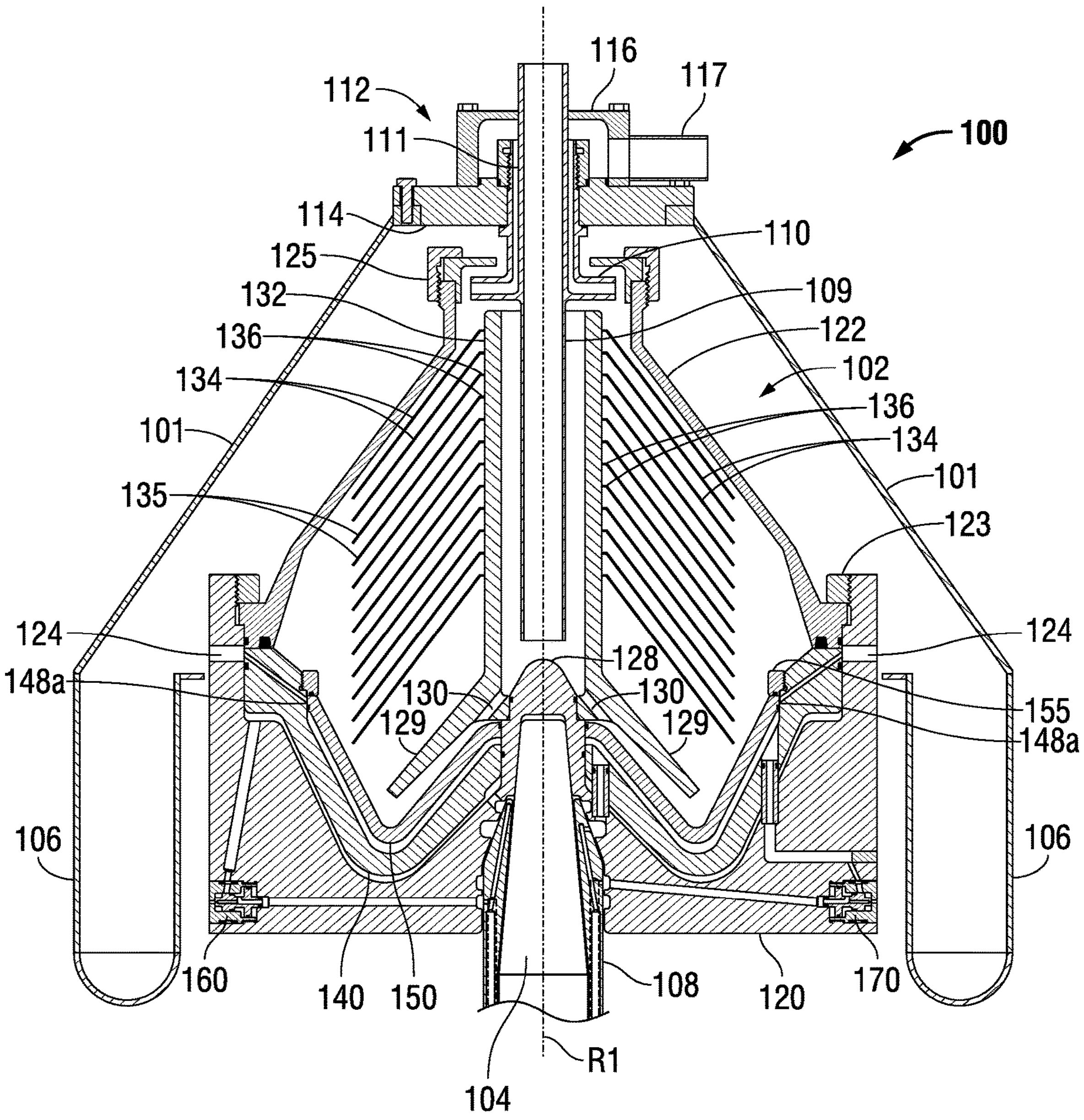
FIG. 2 is a view in section of the separator shown in FIG. 1 along line 2-2 in FIG. 1.

Referring to FIG. 1, an example separator 100 includes a housing 101 within which is mounted a drum assembly shown generally at 102. The section view of FIG. 2 shows that drum assembly 102 is mounted for rotation on a spindle 104. Spindle 104 may be driven by a suitable mechanism (not shown) so as to rotate drum assembly at high speeds about a separator rotational axis R1. As will be discussed in further detail below, this rotation of drum assembly 102 causes fluids within a separator volume defined within the drum assembly to rotate as well and this rotation of the fluids imparts a centrifugal force to the fluids to facilitate the separation of higher-density materials from lower-density materials.

A number of components of separator 100 remain stationary as the drum assembly is rotated about rotational axis R1. Referring particularly to the section view of FIG. 2, these components include housing 101, of course, and the material collection trough 106 forming a lower part of the housing. Other components which remain stationary as the drum assembly is rotated include a spindle sleeve 108 surrounding a portion of spindle 104, a feed tube 109, a centripetal pump 110, and a housing top structure 112. Housing top structure 112 in this example separator 100 includes a top plate 114 which supports centripetal pump 110 and feed tube 109, and also supports an outlet housing 116 and light fraction outlet tube 117.

As shown in FIG. 2, drum assembly 102 includes a drum base 120 and a drum cover 122 secured to the drum base via a connecting ring 123. Drum base 120 includes a number of drum ejection passages 124. Although only two drum ejection passages 124 are shown in the section view of FIG. 2, these drum ejection passages 124 are preferably provided periodically at different angular orientations around the entire circumference of drum base 120. For example, a given implementation may have approximately thirty drum ejection passages 124 spaced apart about the circumference of drum base 120 and thus at different angular orientations about rotational axis R1 at a given orientation of the drum base about that axis. Some of these additional drum ejection passages are shown for example in the cut away perspective view of FIG. 1. As will be described further below, drum ejection passages are used to allow the ejection of material from the separator volume portion of the drum assembly volume, while the drum is rotated about separator rotational axis R1.

Drum cover 122 also includes a cover top structure which includes a housing 125 for centripetal pump 110. Drum base 120 includes a hub 128 for receiving spindle 104. In this example structure, a distributor 129 with distributor passages 130 is mounted on hub 128 together with a disk carrier 132 which extends upwardly from the distributor and hub overlapping feed tube 109. A stack of separator disks 134 are mounted along the length of disk carrier 132, each disk 134 extending downwardly to an outer edge 135 and having a root end 136 connected to the disk carrier. Although not apparent from the figures, those skilled in the art will appreciate that disk carrier 132 includes passages of some type (such as discrete passages or surface grooves for example) which allow the separated lower-density material to escape upwardly toward the top of the drum cover to be removed via centripetal pump 110. This movement of lower-density material will be described further below in connection with the operation of separator 100.

Separator 100 also includes an ejection control element assembly which includes structures used to control the ejection of material from the separator. Example separator 100 includes an ejection control element assembly with two separate ejection control elements, a drum ejection passage control element 140 and an intermediate ejection control element 150, each mounted on drum assembly 102, and in this particular example, within the drum assembly volume defined by drum cover 122 and drum base 120. It will be noted in FIG. 2 and the later figures showing drum assembly 102 that the drum ejection passage control element 140 and intermediate ejection control element 150 are mounted within the drum assembly volume so as to seal a separator volume portion of the drum assembly volume from a lowermost portion of the drum assembly volume. This separator volume is in fluid communication with a feed inlet represented by the lower end of feed tube 109 through which feed material is introduced into the drum assembly for separation under centrifugal force as described further below. Thus it is this separator volume defined in this example above drum ejection passage control element 140 and intermediate ejection control element 150 and below drum cover 122, from which separated materials are ejected through the various passages described below.

Figure 3:
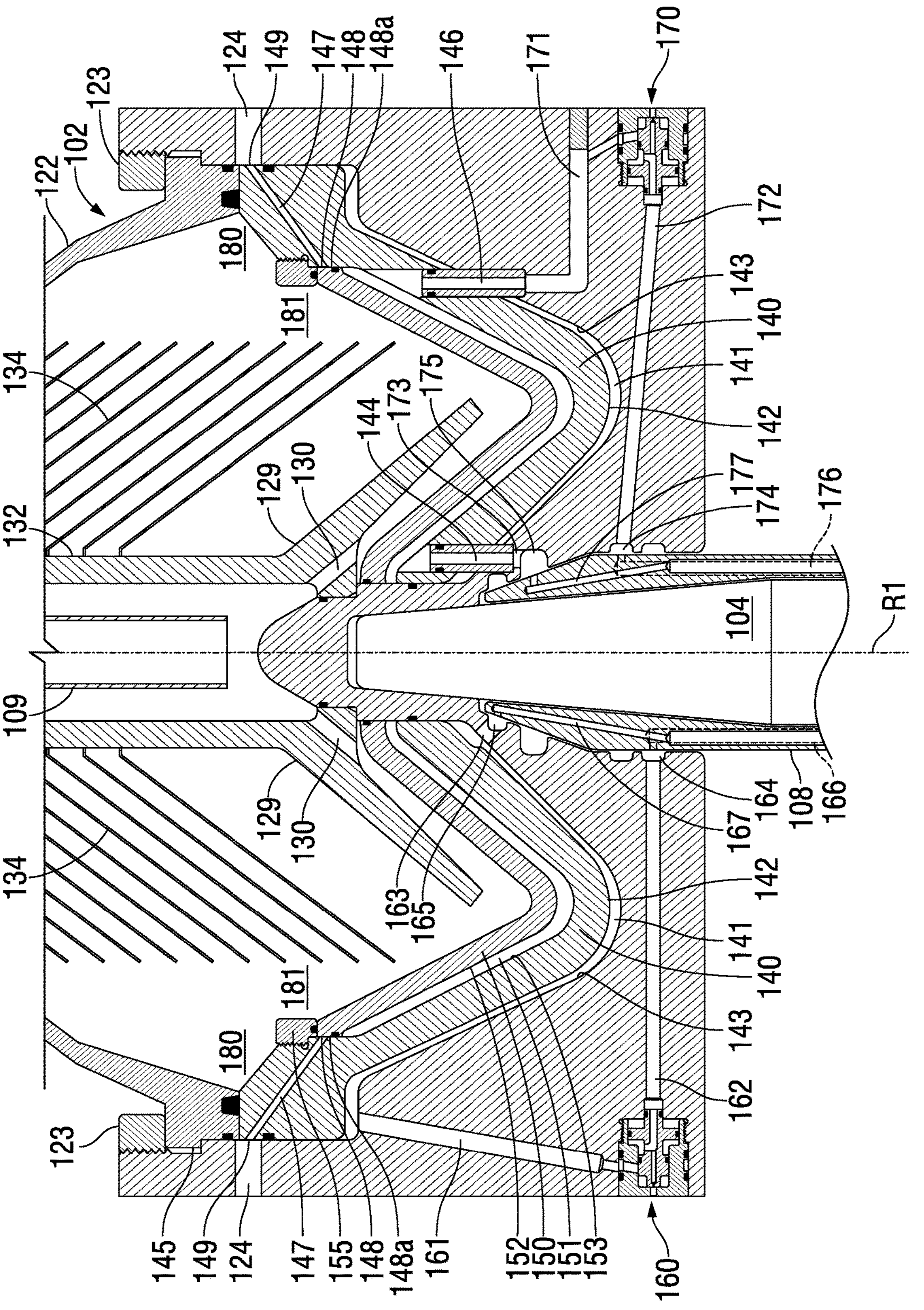
FIG. 3 is a view in section of a lower portion of the drum assembly shown in FIG. 2, enlarged to better show certain features of the separator.

Referring particularly to the enlarged section view of FIG. 3, drum ejection passage control element 140 is mounted on the drum assembly 102 and more particularly within the drum assembly volume in this example so as to define a drum ejection passage control element positioning chamber 141 between a lower surface 142 of the drum ejection passage control element and an upper surface 143 of drum base 120. This drum ejection passage control element positioning chamber 141 comprises the lowermost portion of the drum assembly volume. As will be described further below, drum ejection passage control element 140 is mounted for movement along a range of movement between a drum ejection passage control element first or closed position shown in FIGS. 2 and 3, for example, and a drum ejection passage control element second or open position which will be described below in connection with FIG. 4. In this example separator 100, a lower surface 145 of drum cover 122 provides a stop and sealing surface for drum ejection passage control element 140 at its uppermost position, the closed position shown in FIGS. 2 and 3.

As shown best in FIG. 3, drum ejection passage control element 140 includes a number of middle ejection passages 147, each extending from a middle passage inlet 148 at an inside surface of the drum ejection passage control element to a middle passage outlet 149 at an outside surface of the drum ejection passage control element. While the section view of FIG. 3 shows only two middle ejection passages 147, these passages may be provided periodically at different angular orientations about drum ejection passage control element 140 so that the middle passage outlet 149 of a respective middle ejection passage 147 is in angular alignment with a respective drum ejection passage 124. These middle ejection passages 147 are included in drum ejection passage control element 140 in this example embodiment to facilitate ejection of material from regions of the separator volume radially inside of the region at the maximum diameter as will be discussed below in connection the operation of separator 100.

Referring still to the enlarged section view of FIG. 3, drum ejection passage control element 140 also includes an intermediate fill passage 144 and an intermediate release passage 146. These intermediate fill and release passages 144 and 146, respectively, are used in controlling the position of the intermediate ejection control element 150 in the drum assembly volume as will be discussed below.

As best shown in FIG. 3, intermediate ejection control element 150 is mounted so as to define an intermediate ejection control element positioning chamber 151 between a lower surface 152 of the intermediate ejection control element and an upper surface 153 of drum ejection passage control element 140. Intermediate ejection control element 150 is mounted for movement along range of movement between an intermediate ejection control element first or closed position shown in FIGS. 2 and 3 downwardly to an intermediate ejection control element second or open position which will be described below in connection with FIG. 5. This particular embodiment shown in FIGS. 2 and 3 includes an intermediate ejection control element stop ring 155 which limits the upward movement of intermediate ejection control element 150 to the intermediate ejection control element closed position shown in FIGS. 2 and 3, and provides a sealing surface in that position.

The position of drum ejection passage control element 140 along its range of motion is controlled by a control arrangement which facilitates both filling the drum ejection passage control element positioning chamber 141 with a positioning fluid and release of the positioning fluid from that chamber. This control arrangement in separator 100 is best shown in the enlarged view of FIG. 3 and includes a drum ejection passage control element control valve 160, first release passage 161, first valve control passage 162, and first fill passage 163. All of passages 161, 162, and 163 are formed in drum base 120. First valve control passage 162 terminates at an inner end at a first control fluid annulus 164 while first fill passage 163 terminates at an inner end at a first fill passage annulus 165. Each annulus 164 and 165 is formed in the drum base adjacent to spindle sleeve 108. As will be described further below in connection with the operation of separator 100 a control fluid is supplied to first valve control passage 162 through a first control fluid supply passage 166 located in spindle sleeve 108 and terminating proximate to annulus 164, while a first positioning fluid is supplied to first fill passage 163 and drum ejection passage control element positioning chamber 141 through a first positioning fluid supply passage 167 formed in the spindle sleeve and terminating proximate to annulus 164.

The position of intermediate ejection control element 150 within its range of movement is controlled through a separate control arrangement which facilitates the introduction of a positioning fluid into intermediate ejection control element positioning chamber 151 and release of that fluid from the chamber. As best shown in FIG. 3, the control arrangement for the intermediate ejection control element in separator 100 includes an intermediate ejection control element control valve 170, second release passage 171, second valve control passage 172, and second fill passage 173. Passages 171, 172, and 173 are all formed in drum base 120. Second valve control passage 172 terminates at an inner end at a second control fluid annulus 174 while second fill passage 173 terminates at an inner end at a second fill passage annulus 175. Each annulus 174 and 175 is formed in the drum base adjacent to spindle sleeve 108. As will be described further below in connection with the operation of separator 100, a second control fluid is supplied to second valve control passage 172 through a second control fluid supply passage 176 located in spindle sleeve 108 and terminating proximate to annulus 174, while a second positioning fluid is supplied to second fill passage 173 and intermediate ejection control element positioning chamber 151 through a second positioning fluid supply passage 177 formed in the spindle sleeve 108 and terminating proximate to annulus 174.

It will be appreciated that the various components of separator 100 such as the drum base 120 and drum cover 122 are generally symmetrical about separator rotational axis R1 aside from the various passages which may be formed in the components, such as passages 161, 162, 171, and 172, for example, which are located at a particular angular orientation about axis R1. So too are components mounted within the drum assembly such as distributor 129, disk carrier 132, drum ejection passage control element 140, intermediate ejection control element 150 generally symmetrical about separator rotational axis R1 aside from any passages or other features formed in those components such as passages 144 and 146 in drum ejection passage control element 140 for example. This symmetry of drum ejection passage control element 140 in the example shown in FIGS. 2-5 and 7 results in the inner surface 148*a* of drum ejection passage control element 140 in which each middle passage inlet 148 is formed having a substantially constant radius about separator rotational axis R1 around the entire circumference of the inner surface 148*a*.

As noted above, in FIGS. 2 and 3 both drum ejection passage control element 140 and intermediate ejection control element 150 are at their respective closed position. In these positions the separator volume is closed to drum ejection passages 124 and middle ejection passages 147. A feed material to be processed is introduced into the separator volume through a feed inlet comprising the lower end of feed tube 109 and flows out through distributor passages 130 and into the region of the separator volume outside of disk carrier 132. The rotation of drum assembly 102 about axis R1 imparts a rotation to the fluid collecting in this region of the separator volume. The centrifugal force applied by this rotation causes higher-density particles and material within the feed material to move outwardly toward the periphery of the separator volume so as to collect in the region of maximum diameter shown generally at 180 in FIG. 3. The lower-density constituents in the feed material are displaced inwardly toward the center of rotation of drum assembly 102 about axis R1 and flows up through the passages or channels (not shown) associated with disk carrier 132 to the area of centripetal pump 110 shown in FIG. 2 where the material is pumped upwardly through passages 111 to the outlet chamber defined by outlet housing 116 and ultimately out through outlet tube 117. While the higher-density material is collecting in the region 180 of maximum diameter within the separator volume and the lightest constituents of the feed material is displaced ultimately out through outlet tube 117, intermediate-density material may collect at an intermediate region 181 (labeled in FIGS. 3-5 and 7) in the separator volume just beyond the outer ends 135 of disks 134 but relatively inside of region 180 where the higher-density material is collecting.

Figure 4:
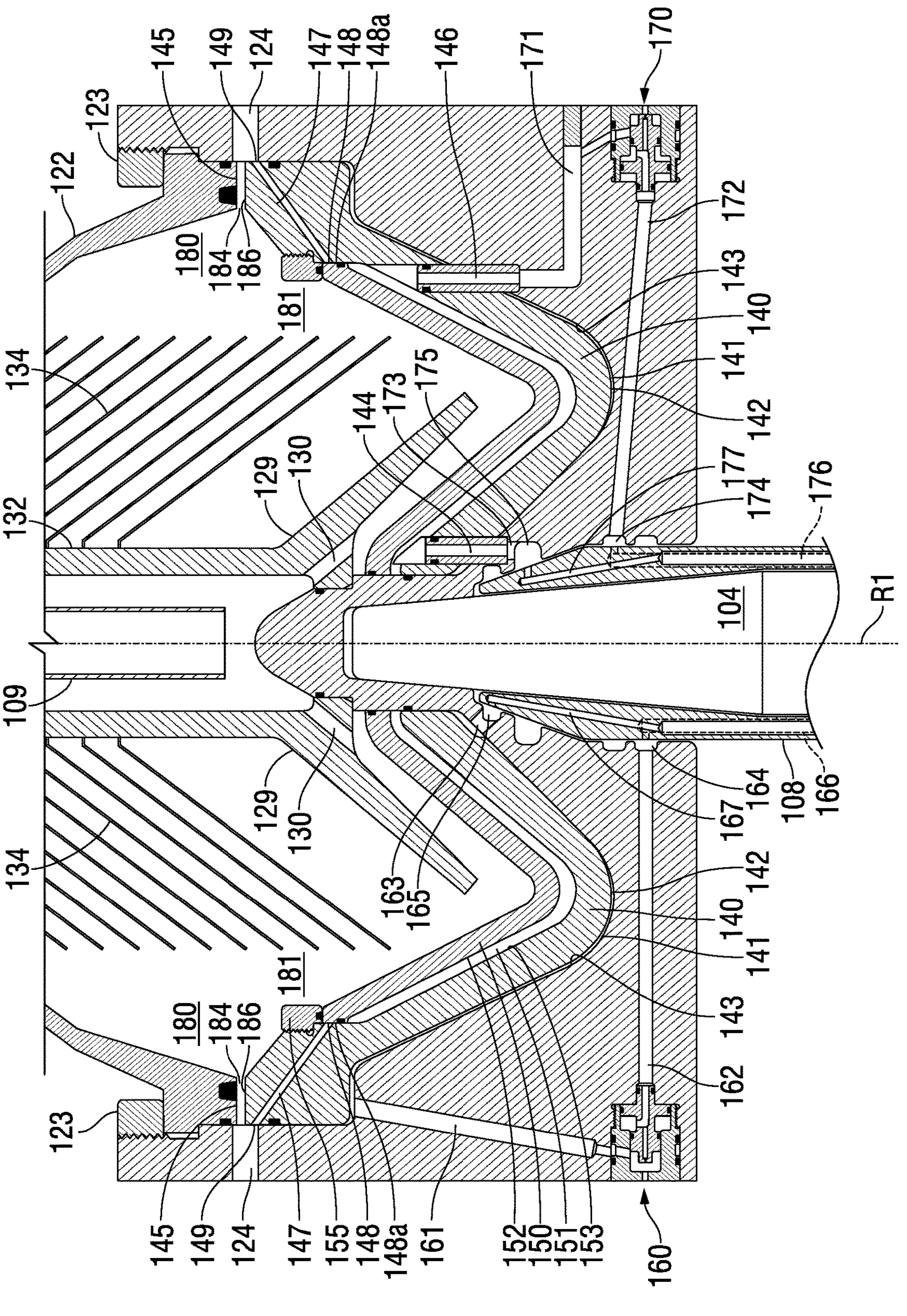
FIG. 4 is a view in section similar to FIG. 3, but with the drum ejection passage control element in its second (open) position.

In order to eject material that has collected at the maximum diameter of the separator volume in the region shown generally at 180 in FIG. 3, separator 100 may be operated to move drum ejection passage control element 140 from the drum ejection passage control element closed position shown in FIGS. 2 and 3 to the drum ejection passage control element open position shown in FIG. 4. This movement of drum ejection passage control element 140 from the drum ejection passage control element closed position to the drum ejection passage control element open position is accomplished by supplying a control fluid through drum ejection passage control element control fluid supply passage 166 to drum ejection passage control element control passage 162 and ultimately to drum ejection passage control element control valve 160. This application of control fluid to drum ejection passage control element control valve 160 moves the control valve from a closed position to an open position in which a positioning fluid such as water held in drum ejection passage control element positioning chamber 141 may escape from the drum ejection passage control element positioning chamber through drum ejection passage control element release passage 161 and drum ejection passage control element control valve 160. The force applied from the weight of drum ejection passage control element 140 and the centrifugal force applied by the feed material on drum ejection passage control element 140 forces positioning fluid from drum ejection passage control element positioning chamber 141. The centrifugal force on the positioning fluid also urges the positioning fluid from drum ejection passage control element positioning chamber. This movement of positioning fluid allows drum ejection passage control element 140 to move downwardly to the drum ejection passage control element open position shown in FIG. 4. In this drum ejection passage control element open position, drum ejection passages 124 are open to the separator volume through a gap 184 formed between a lower surface 145 of drum cover 122 and an upper surface 186 of drum ejection passage control element 140. In other words, in the position shown in FIG. 4, the drum ejection passage control element 140 defines a flow area (the area indicated by gap 184 in this example) through a given drum ejection passage 124 from the separator volume to an area outside the separator volume. Thus material collected in the region 180 within the separator volume is ejected through gap 184 under the centrifugal force applied to the material as the drum assembly rotates about separator rotational axis R1. This ejected material is collected in trough 106 (shown in FIG. 2) for removal from separator 100. This flow area indicated by gap 184 in FIG. 4 is in contrast to the condition of separator 100 in FIG. 3 in which the position of drum ejection passage control element 140 relative to a given drum ejection passage 124 defines a smaller, essentially zero flow area, thus preventing material from being ejected through the drum ejection passage 124.

In order to move drum ejection passage control element 140 back from the drum ejection passage control element open position shown in FIG. 4 to the drum ejection passage control element closed position shown in FIGS. 2 and 3 in which drum ejection passage control element 140 blocks the drum ejection passages 124, the supply of control fluid to drum ejection passage control element control valve 160 is discontinued to allow the drum ejection passage control element control valve to move back to its closed position in which first release passage 161 is once again isolated from the atmosphere. Positioning fluid such as water may be supplied through positioning fluid supply passage 167 in spindle sleeve 108 to annulus 165 and through drum ejection passage control element fill passage 163 into drum ejection passage control element positioning chamber 141. This positioning fluid continues to collect in drum ejection passage control element positioning chamber 141 to raise drum ejection passage control element 140 back to the closed position shown in FIGS. 2 and 3.

Figure 5:
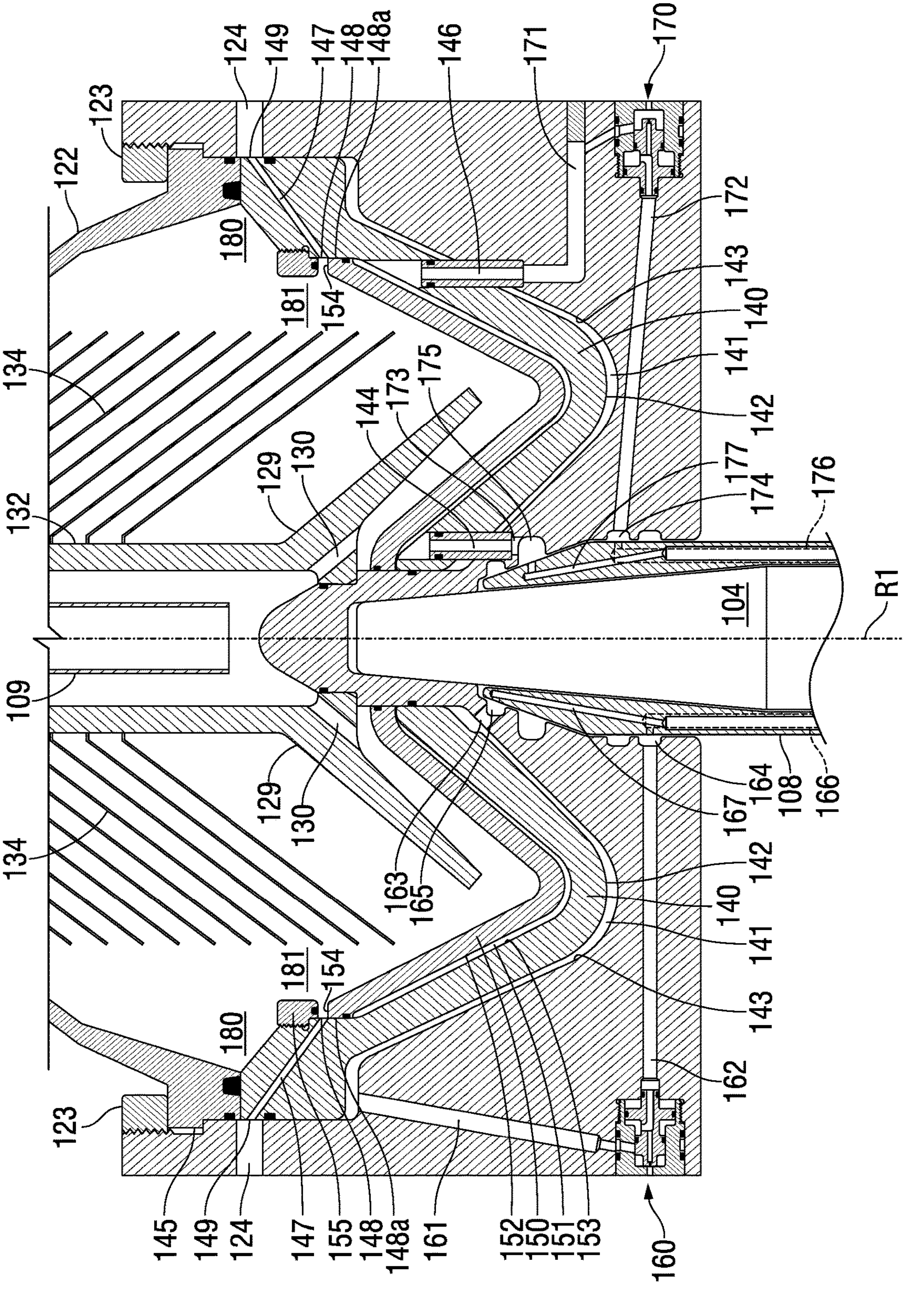
FIG. 5 is a view in section similar to FIG. 3, but with the intermediate ejection control element in its second (open) position.

FIGS. 3 and 5 may be referenced to describe the operation of separator 100 to move intermediate ejection control element 150 from the intermediate ejection control element closed position to the intermediate ejection control element open position. With intermediate ejection control element 150 and drum ejection passage control element 140 both in their respective closed position shown in FIG. 3 and while drum assembly 102 rotates at the separator velocity about separator axis R1, a control fluid such as water may be supplied through intermediate ejection control element control supply passage 176 in spindle sleeve 108 to the annulus 174 and through second control passage 172 to intermediate ejection control element control valve 170. The pressure of the control fluid moves intermediate ejection control element control valve 170 from a closed position to an open position shown in FIG. 4. In this open position of valve 170, a positioning fluid which has been previously trapped in intermediate ejection control element positioning chamber 151 to hold intermediate ejection control element 150 in the closed position shown in FIGS. 2 and 3 flows through release passages 171 and 149 and through valve 170 to the atmosphere. This flow of positioning fluid from intermediate ejection control element positioning chamber 151 occurs under the force provided by the weight of intermediate ejection control element 150 and by the centrifugal force on the positioning fluid applied by the rotation of drum assembly 102 about axis R1. The release of fluid from intermediate ejection control element positioning chamber 151 allows the intermediate ejection control element to move downwardly to the intermediate ejection control element open position shown in FIG. 5. This downward movement moves the upper lateral surface 154 of intermediate ejection control element 150 below inlet 148 of each middle ejection passage 147 to provide a respective ejection route for material to be ejected from the separator volume. In other words, in the position of intermediate ejection control element 150 shown in FIG. 5, the intermediate ejection control element is positioned relative to the inlet 148 to define a flow area, in this case the entire area of inlet 148 to allow material to be ejected from the separator volume. This is in contrast to the position of intermediate ejection control element 150 shown in FIG. 3 in which the element 150 defines a lower flow area, essentially zero flow area in this example, through middle ejection passage 147. Because inlet 148 of each middle ejection passage 147 is well inward of the region 180 of maximum diameter, moving intermediate ejection control element 150 to the intermediate ejection control element open position shown in FIG. 5 allows an intermediate-density material which has collected in intermediate region 181 to be ejected from the separator volume without ejecting material which has collected in region 180.

In order to move intermediate ejection control element 150 back from the intermediate ejection control element open position shown in FIG. 5 to the intermediate ejection control element closed position shown in FIGS. 2 and 3, the supply of control fluid to intermediate ejection control element control valve 170 is discontinued to allow the drum ejection passage control element control valve to move back to its closed position in which second release passage 171 is once again isolated from the atmosphere. Positioning fluid such as water may then be supplied through positioning fluid supply passage 177 in spindle sleeve 108 to annulus 175 and through intermediate ejection control element fill passages 144 and 173 into intermediate ejection control element positioning chamber 151. Positioning fluid continues to collect in intermediate ejection control element positioning chamber 151 to raise intermediate ejection control element 150 back to the closed position shown in FIGS. 2 and 3 in which each middle ejection passage is closed to fluid communication from the separator volume to the area outside the separator volume.

Figure 6:
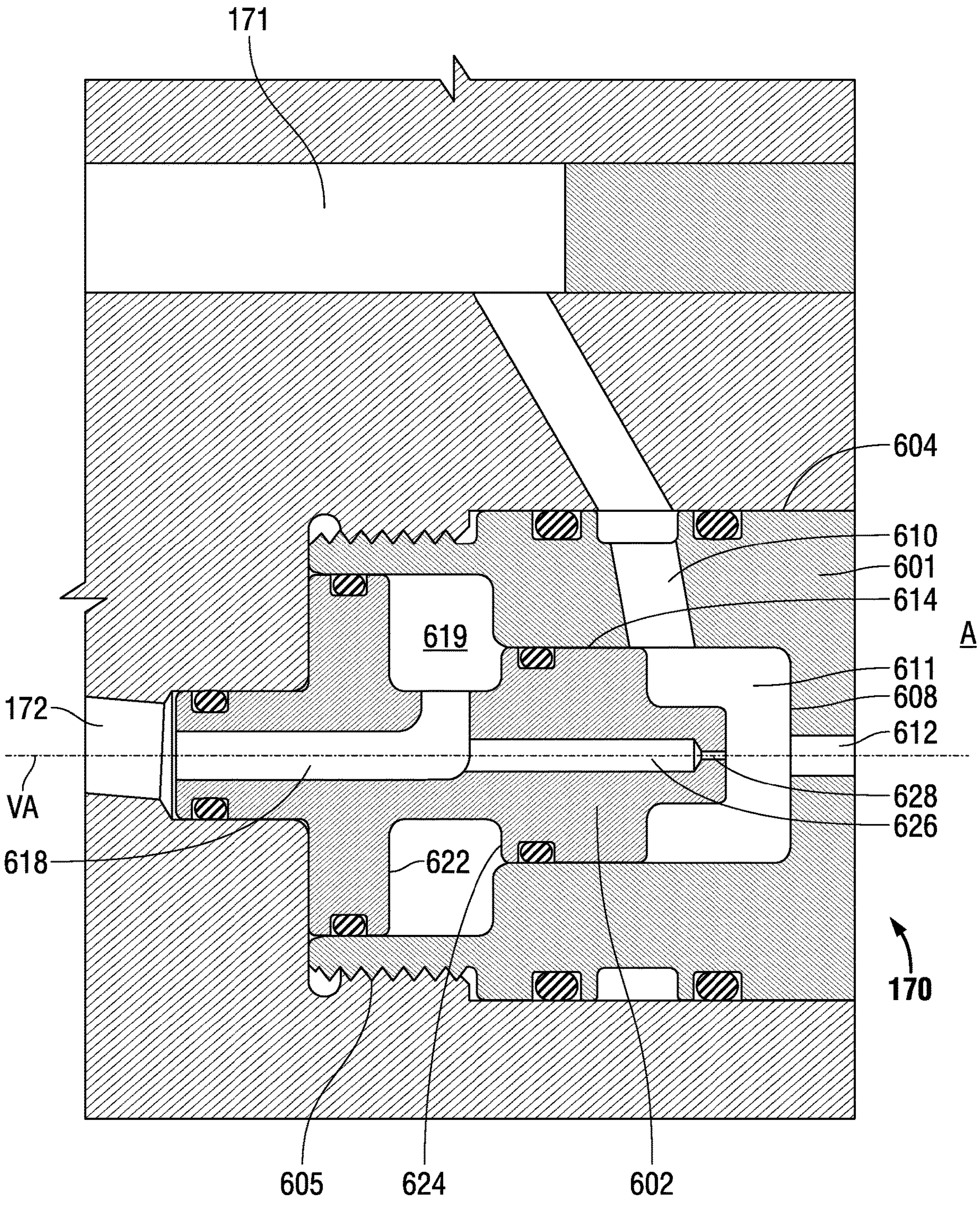
FIG. 6 is an enlarged section view of the intermediate ejection control element control valve shown in FIGS. 2-5.
Figure 7:
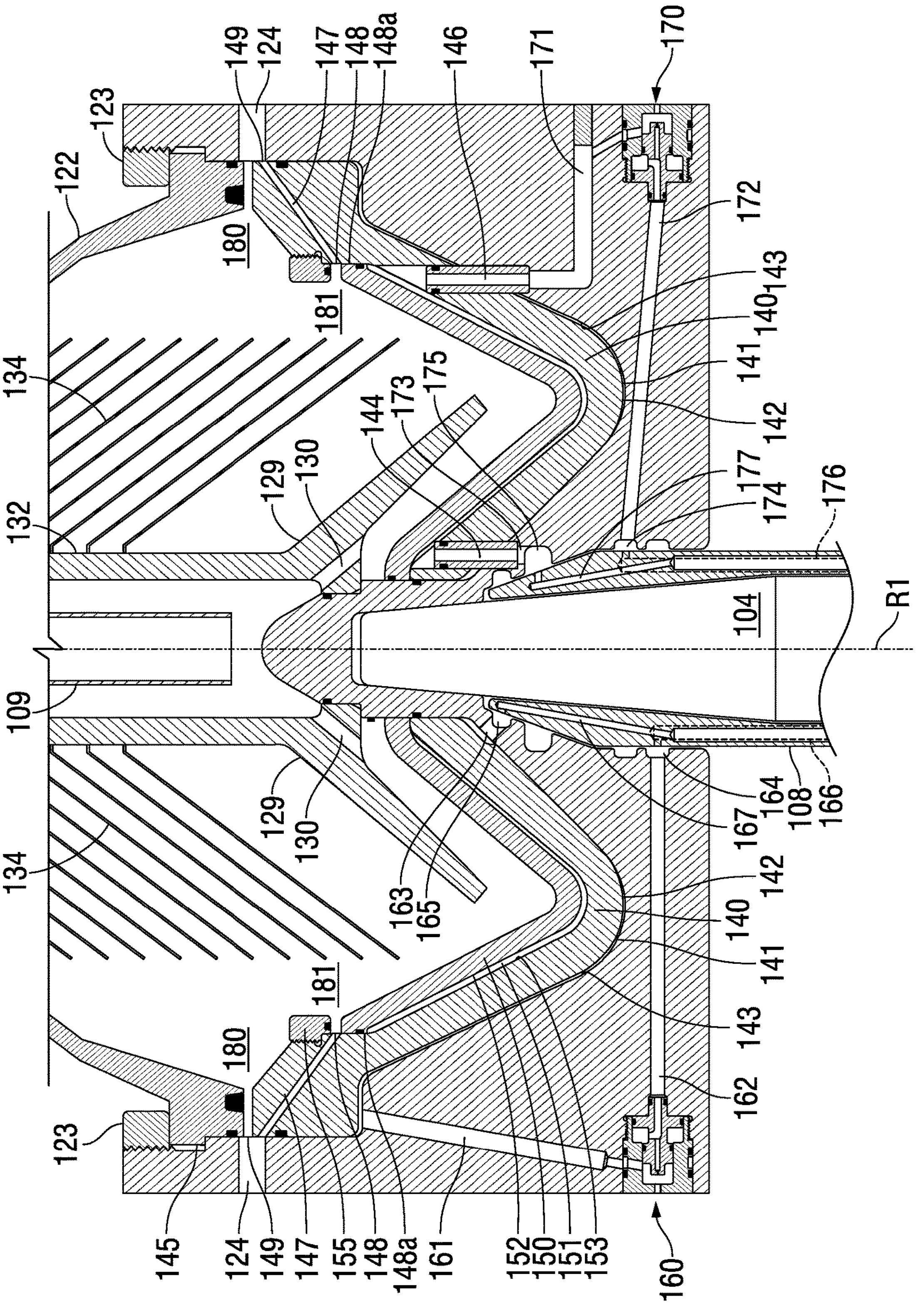
FIG. 7 is a view in section similar to FIG. 3, but with both the drum ejection passage control element and the intermediate ejection control element moved to the respective second (open) position.

FIG. 6 shows further detail of intermediate ejection control element control valve 170 to facilitate a description of the operation of the valve in moving between its closed to open positions to facilitate the positioning of intermediate ejection control element 150 as described above. As shown in FIG. 6, intermediate ejection control element control valve 170 includes a valve housing 601 and a valve slide element 602, both of which having a respective external shape which in this embodiment is essentially symmetrical about a valve axis shown at VA in FIG. 6. Several O-rings (which are not individually labelled) are included on both valve housing 601 and valve slide element 602 to provide seals within the valve structure. Valve housing 601 is retained in a valve receptacle 604 formed in drum base 120 through a threaded connection 605 in this example. Valve slide member 602 is mounted within a cavity 608 formed in valve housing 601 and is adapted to slide between an open position shown FIG. 6 and a closed position shifted to the right in the orientation of FIG. 6. In the open position shown FIG. 6, second release passage 171 is open to the atmosphere A through valve passage 610, a release portion 611 of cavity 608, and outlet passage 612. It will be appreciated that in the closed position in which the valve slide member is shifted essentially as far as possible to the right from the position of FIG. 6, a blocking portion 614 of valve slide member 602 blocks valve passage 610 and prevents fluid from being released through second release passage 171. Thus in this closed position of control valve 170, positioning fluid may not escape from intermediate ejection control element positioning chamber 151 (FIGS. 2-5) and intermediate ejection control element 150 remains in the position dictated by the volume of positioning fluid then contained in intermediate ejection control element positioning chamber 151.

In operation of separator 100, centrifugal force from the rotation of drum assembly 102 about axis R1 (FIGS. 2-5) causes valve slide member 602 to reside in the closed position unless control fluid is applied through second control passage 172. In order to move valve slide member 602 to the open position shown in FIG. 6, control fluid is applied through second control passage 172 into a distribution passage 618 and ultimately to an annular area 619 defined between valve slide member 602 and valve housing cavity 608. Due to the relatively larger surface area at surface 622 of valve slide member 602 relative to the opposing surface 624, pressure within annular area 619 urges valve slide member 602 to the left and ultimately to the open position shown in FIG. 6. Valve slide member 602 remains in this open position as long as sufficient control fluid pressure is applied to the annular area 619. Once a control fluid is no longer applied through second control passage 172, the control fluid eventually exits through closing passage 626 and orifice 628 and ultimately through outlet 612 to the atmosphere to allow valve slide member 602 to shift right to the closed position under the centrifugal force applied to valve slide member 602 by rotation of drum assembly 102 (the drum assembly 102 shown fully in FIG. 2).

Although FIG. 6 shows intermediate ejection control element control valve 170, drum ejection passage control element control valve 160 may include an identical structure. In the case of control valve for the drum ejection passage control element, control fluid would reach the valve through first control passage 162, and the valve would be positioned to alternatively block or open first release passage 161.

As described above in connection with FIGS. 2-5, drum ejection passage control element 140 and intermediate ejection control element 150 may be operated independently to place either control element in its respective open or closed position. However, the particular example separator 100 allows both control elements 140 and 150 to be moved to the respective open position simultaneously. This condition in which both control elements 140 and 150 are in their respective open position is shown in the section view of FIG. 7. In this case both drum ejection passage control element control valve 160 and intermediate ejection control element control valve 170 are in the open position allowing the respective control element to move downwardly to the open position. Thus gaps 184 are formed to facilitate ejection of material from region 180 and middle ejection passages 147 are open to facilitate ejection of material collected in intermediate region 181. It should be noted however that in the normal operation of separator 100 (that is, to separate higher-density and lower-density materials from a feed stream), drum ejection passage control element 140 and intermediate ejection control element 150 would typically not be placed simultaneously in their respective open position shown in FIG. 7. However, the ability to place both control elements 140 and 150 in the respective open position might be helpful for clean-in-place operations.

In the example of separator 100, intermediate ejection control element 150 has essentially a single open position to open an ejection route from the intermediate region 181 of the separator volume. FIGS. 8 and 10-13 show a portion of an alternate separator 800 corresponding to the portion of separator 100 shown in the enlarged views of FIGS. 3-5 and 7. In this alternate embodiment shown in FIGS. 8 and 10-13 (and the further enlarged view of FIG. 9), the intermediate ejection control element has multiple open positions, each open position reaching a different radius in the intermediate region of the separator volume to allow the ejection of material from that region. Aside from intermediate ejection control element 850 in the alternative separator and the range of movement of intermediate ejection control element 850, all of the components of the alternative separator are identical to those shown in the example of separator 100. Although not shown in the enlarged partial section views of FIGS. 8-13, the alternative separator will include elements corresponding to housing 101, centripetal pump 110, housing top structure 112, and pump housing 125 shown in FIG. 2. As shown in the enlarged partial section views of FIGS. 8-13, the alternate separator further includes a drum assembly including a drum cover 822, drum base 820, connecting ring 823, distributor 829, disk carrier 832, disks 834, feed tube 809, drum ejection passage control element 840, and stop ring 855 similar to separator 100 shown in FIGS. 1-3. Separator 800 further includes a spindle sleeve 808, a drum ejection passage control element control arrangement including a drum ejection passage control element control valve 860 and intermediate ejection control element control arrangement including an intermediate ejection control element control valve 870, again similar to the corresponding elements in separator 100. Separator 800 is mounted on a spindle 804 for rotation about a separator rotational axis R2.

However, unlike the separator 100, intermediate ejection control element 850 of separator 800 includes a number of sets of at least one inner ejection passage through the intermediate ejection control element. Each set of at least one inner ejection passage is shown in FIGS. 8-13 generally at reference numeral 888 and each respective inner ejection passage of each set may be used to form a portion of an intermediate ejection path from the separator volume. In the example separator 800 in FIGS. 8-13, and referring particularly to the further enlarged section view of FIG. 9, intermediate ejection control element 850 includes a number of sets 888 of three different inner ejection passages, first inner ejection passage 890, second inner ejection passage 893, and third inner ejection passage 896, each set duplicated preferably around the circumference of intermediate ejection control element 850 in a manner similar to the way in which the respective middle ejection passages 847 of drum ejection passage control element 840 and drum ejection passages 824 are duplicated at different angular orientations about the separator rotational axis R2. Each different inner ejection passage 890, 893, and 896 in each set 888 resides at a respective angle to the separator rotational axis R2 in the plane of the section as measured from a plane perpendicular to the rotational axis R2. These different angles place the inlet end of each inner ejection passage at a different point within the separator volume relative to rotational axis R2. Referring to FIG. 9, first inner ejection passage 890 has in inlet 891 at radius E1 from rotational axis R2 while second inner ejection passage 893 as an inlet 894 at radius E2, and third inner ejection passage 896 has an inlet 897 at radius E3. Thus any of the different inner ejection passages 890, 893, and 896 may be positioned with respect to a respective middle ejection passage 847 to form an ejection route from a different intermediate region within the separator volume. It should be noted that in the embodiment of FIGS. 8-13 a preferably continuous groove 848*a* is formed around the entire inside surface of drum ejection passage control element 840. This groove 848*a* provides the inlet to middle ejection passages 847 so that the different inner ejection passages 890, 893, and 896 of intermediate ejection control element 850 need not align angularly with a respective middle ejection passage 847 to provide a continuous flow path from intermediate areas of the separator volume as will be described further below. Similarly to the previously described embodiment, each middle ejection passage 847 extends to an outlet 849 which is open to a respective drum ejection passage 824.

Figure 8:
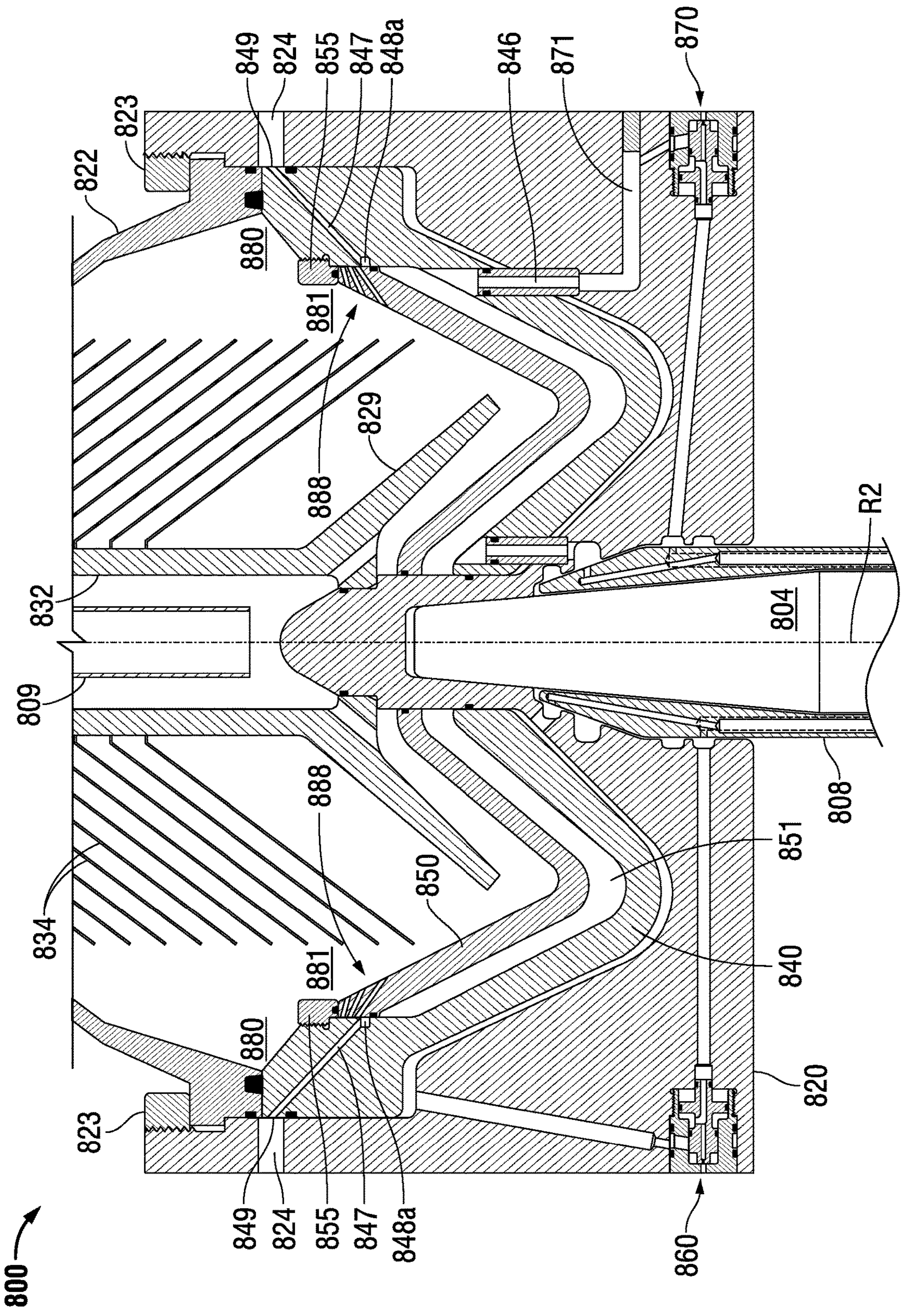
FIG. 8 is a view in section similar to FIG. 3, of an additional separator embodying the principles of the invention.
Figure 9:
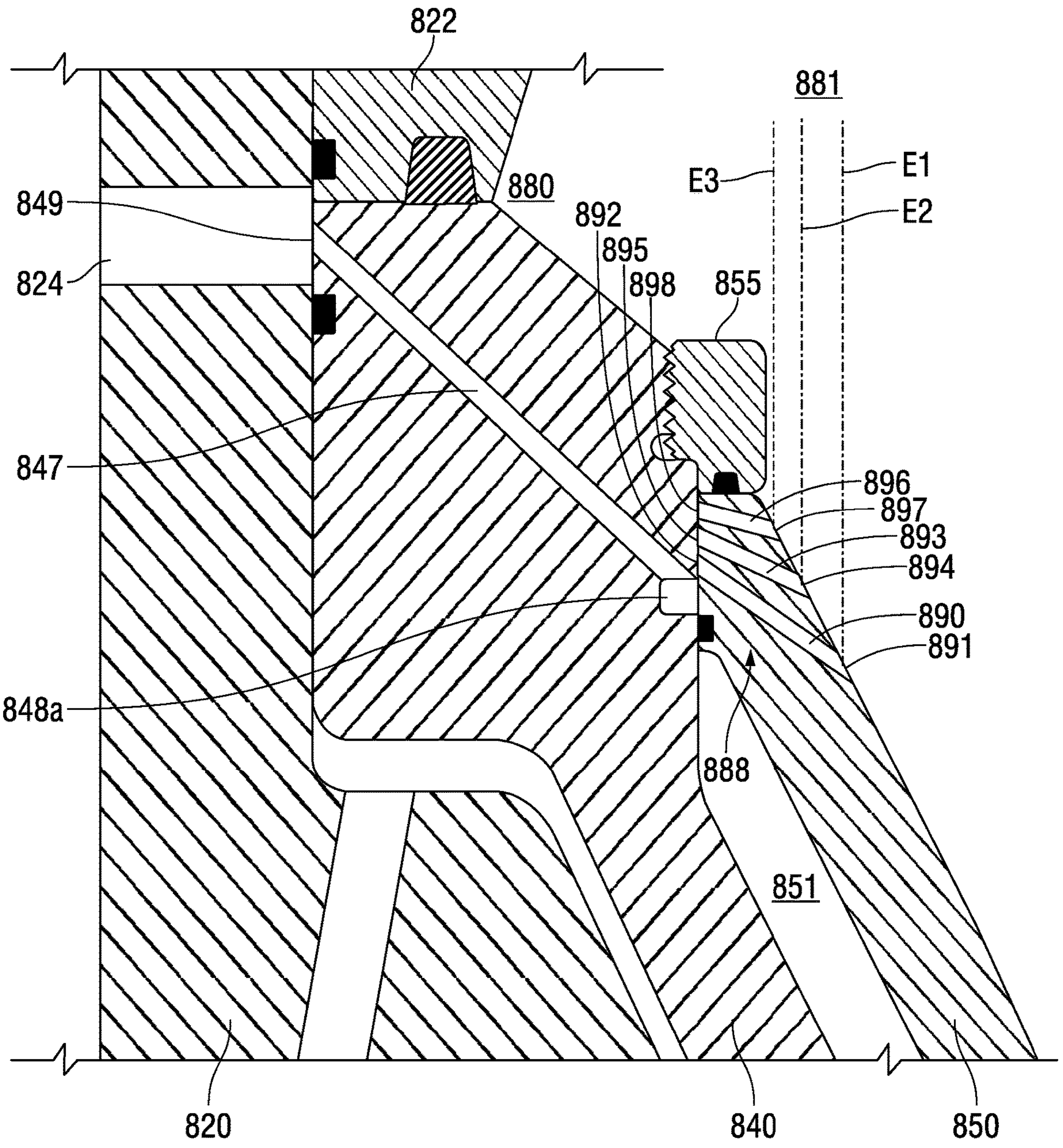
FIG. 9 is an enlarged section view of a set of inner ejection passages and adjacent structure shown in FIG. 8.
Figure 10:
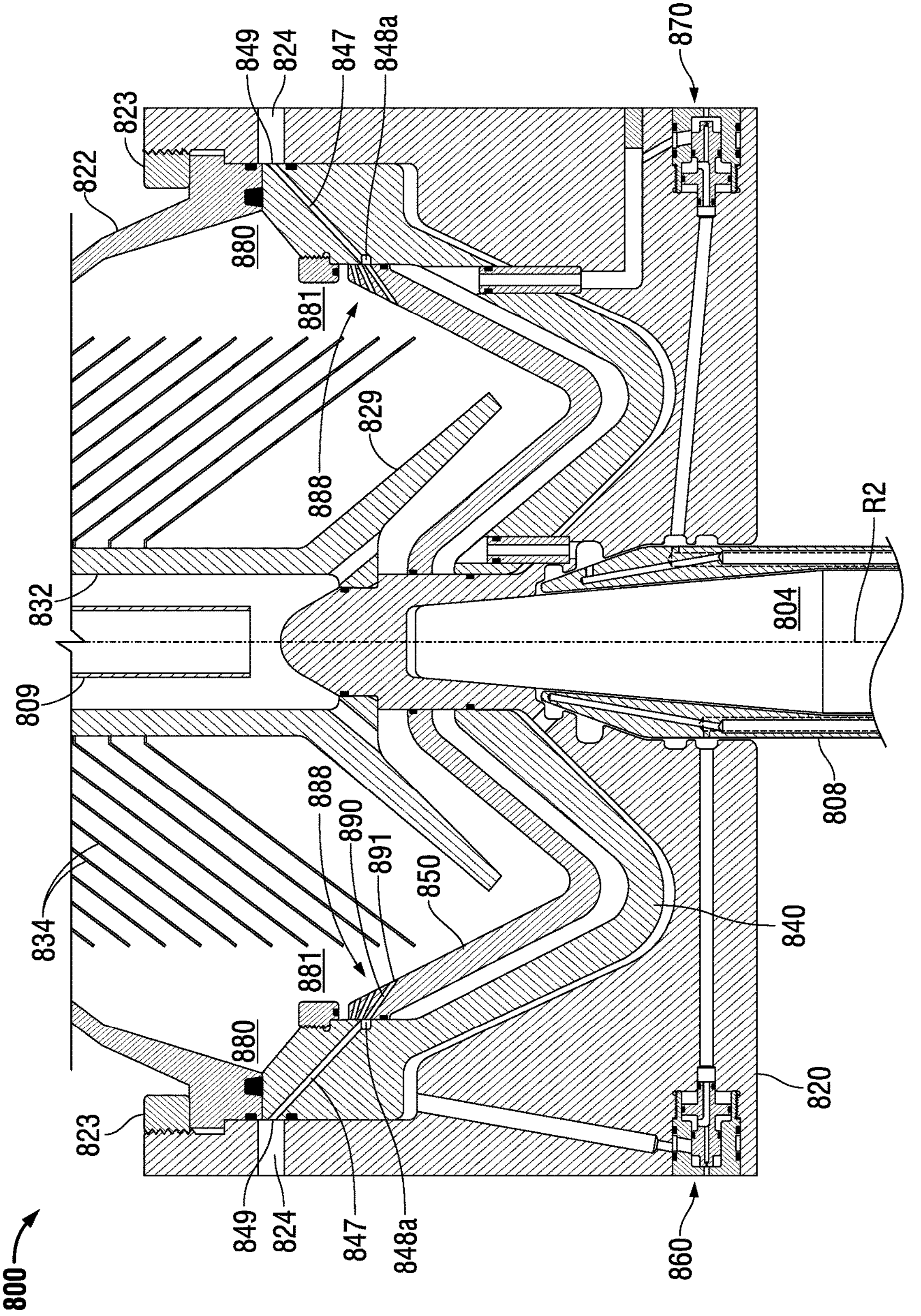
FIG. 10 is a view in section similar to FIG. 8, but with the intermediate ejection control element in a first open position.
Figure 11:
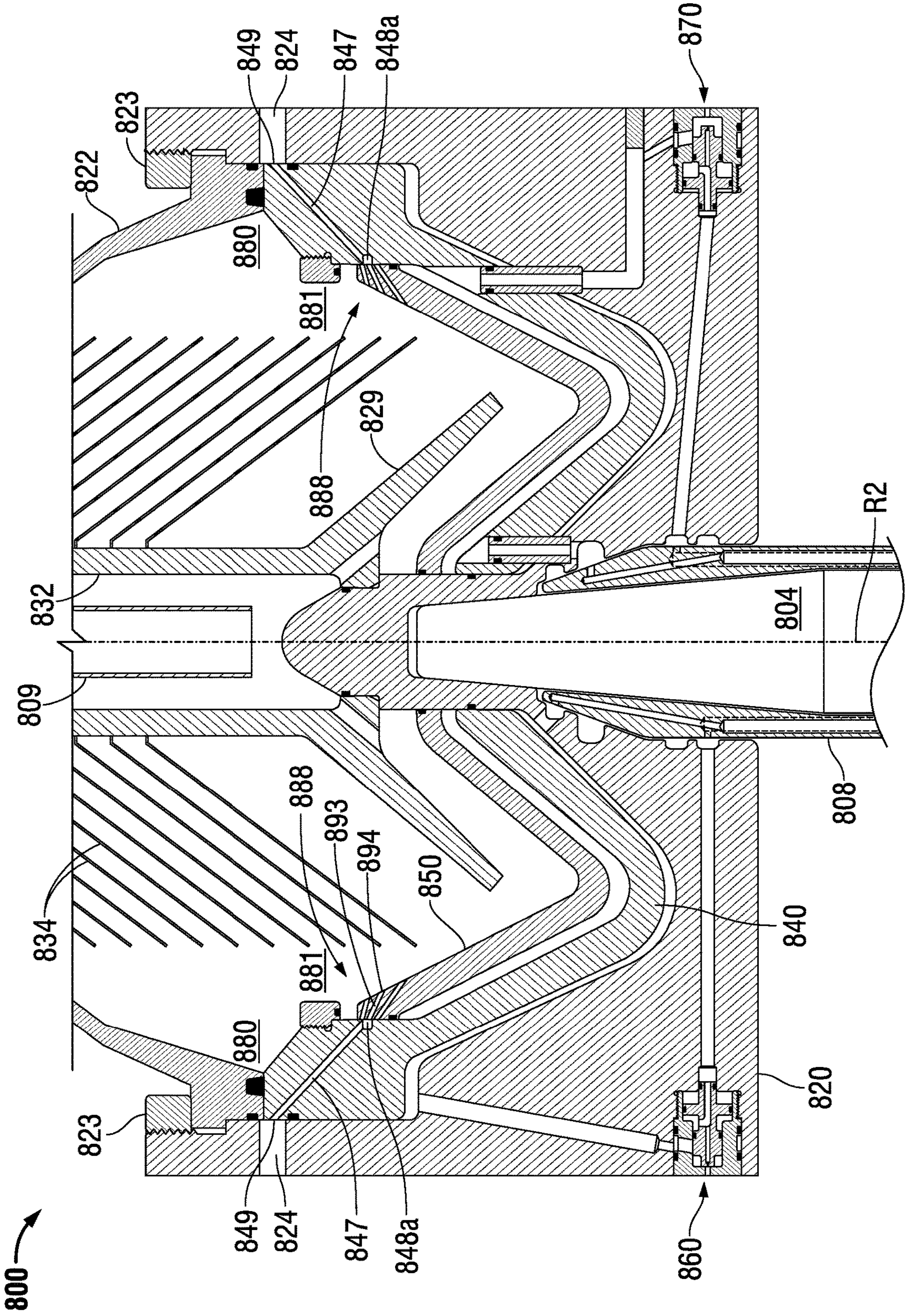
FIG. 11 is a view in section similar to FIG. 8, but with the intermediate ejection control element in a first additional open position.
Figure 12:
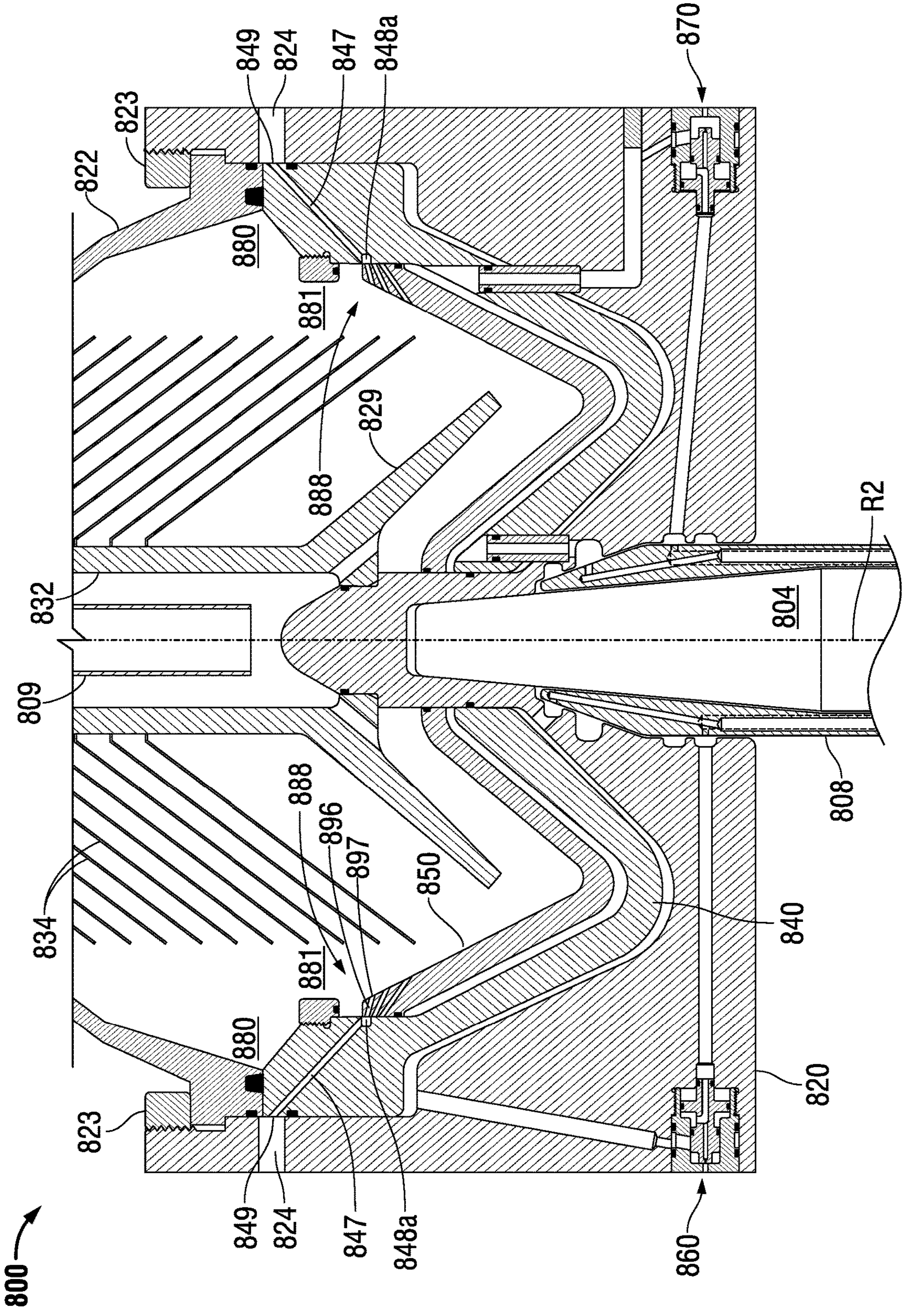
FIG. 12 is a view in section similar to FIG. 8, but with the intermediate ejection control element in a second additional open position.

In the condition of the portion of separator 800 shown in FIG. 8 both drum ejection passage control element 840 and intermediate ejection control element 850 are in their respective closed position. In these positions the higher-density material from a feed stream introduced into the separator volume through feed tube 809 collects under the centrifugal force at the region of maximum diameter generally shown at 880. The lowest density material in the feed stream is displaced inwardly toward rotational axis R2 and ultimately forced to the top of the separator volume where it is picked up by the centripetal pump and removed through outlet tube (elements corresponding to pump 110 and outlet tube 118 shown in FIG. 2). An intermediate-density material may collect in the intermediate region 881 just outside of disks 834 but inside of the region 880 of the separator volume relative to rotational axis R2.

To open the first inner ejection passage 890, intermediate ejection control element control valve 870 is cycled partially open with a first volume of control fluid specific to the first inner ejection passage. This cycling of intermediate ejection control element control valve 870 partially open allows positioning fluid in intermediate ejection control element positioning chamber 851 to be released through release passages 846 and 871 to allow intermediate ejection control element 850 to move downwardly to the first open position shown in FIG. 10. In this position there is a continuous flow path from at least a portion of an outlet 892 of first inner ejection passage 890 and (via groove 848*a*) a middle ejection passage 847 so that the first inner ejection passage 890 and middle ejection passage 847 together form a route for ejecting material from region 881, particularly at radius E1 of the separator volume through at least one drum ejection passage 824.

To open second inner ejection passage 893, intermediate ejection control element control valve 850 is cycled partially open with a second volume of control fluid specific to the second inner ejection passage. This cycling of intermediate ejection control element control valve 870 with the second volume of control fluid allows positioning fluid to be released from intermediate ejection control element positioning chamber 851 so that intermediate ejection control element 850 drops to a second open position at the level shown in FIG. 11. In this second open position for intermediate ejection control element 850, an outlet 895 of second inner ejection passage 893 aligns with the inlet groove 848*a* so that the middle ejection passage 847 and inner ejection passage 893 together form a second ejection route from the separator volume to a respective drum ejection passage 824. This second ejection route starts from an inlet point at radius E2.

To open third inner ejection passage 896, intermediate ejection control element control valve is cycled partially open with yet a different, third volume of control fluid specific to the third inner ejection passage. This cycling of intermediate ejection control element control valve 870 to a third partially open position, more open than for the first and second inner ejection passages 890 and 893, allows more positioning fluid to be released from intermediate ejection control element positioning chamber 851. This allows intermediate ejection control element 850 to drop to a third open position at the level shown in FIG. 12. In this third open position, an outlet 898 of third inner ejection passage 896 aligns at least partially with the inlet groove 848*a* so that the passages 896 and 847 together form a third ejection route from the separator volume having an inlet point at radius E3.

Figure 13:
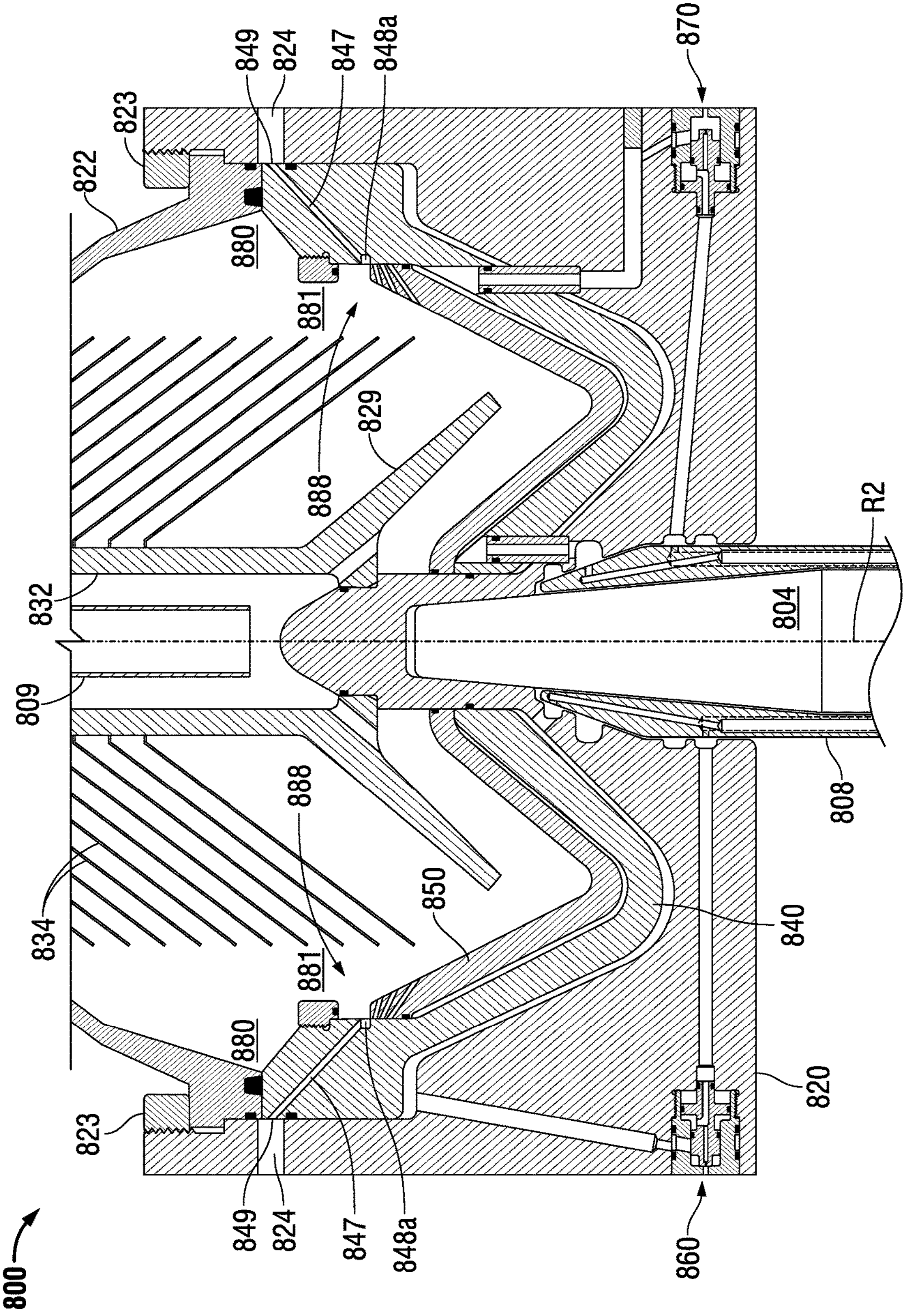
FIG. 13 is a view in section similar to FIG. 8, but showing the intermediate ejection control element in another open position.

The alternative separator illustrated by the portions shown in FIGS. 8-13 may also be operated to fully open intermediate ejection control element control valve 870 to allow intermediate ejection control element 850 to drop to the level shown in FIG. 13. In this position middle ejection passages 847 are directly open to the separator volume via groove 848*a* to allow the ejection of material in the intermediate region 881. This the arrangement provides a fourth ejection route from the separator volume at a radius from the axis of rotation defined by the surface of drum ejection passage control element 840 in which inlet groove 848*a* is formed.

Figure 14:
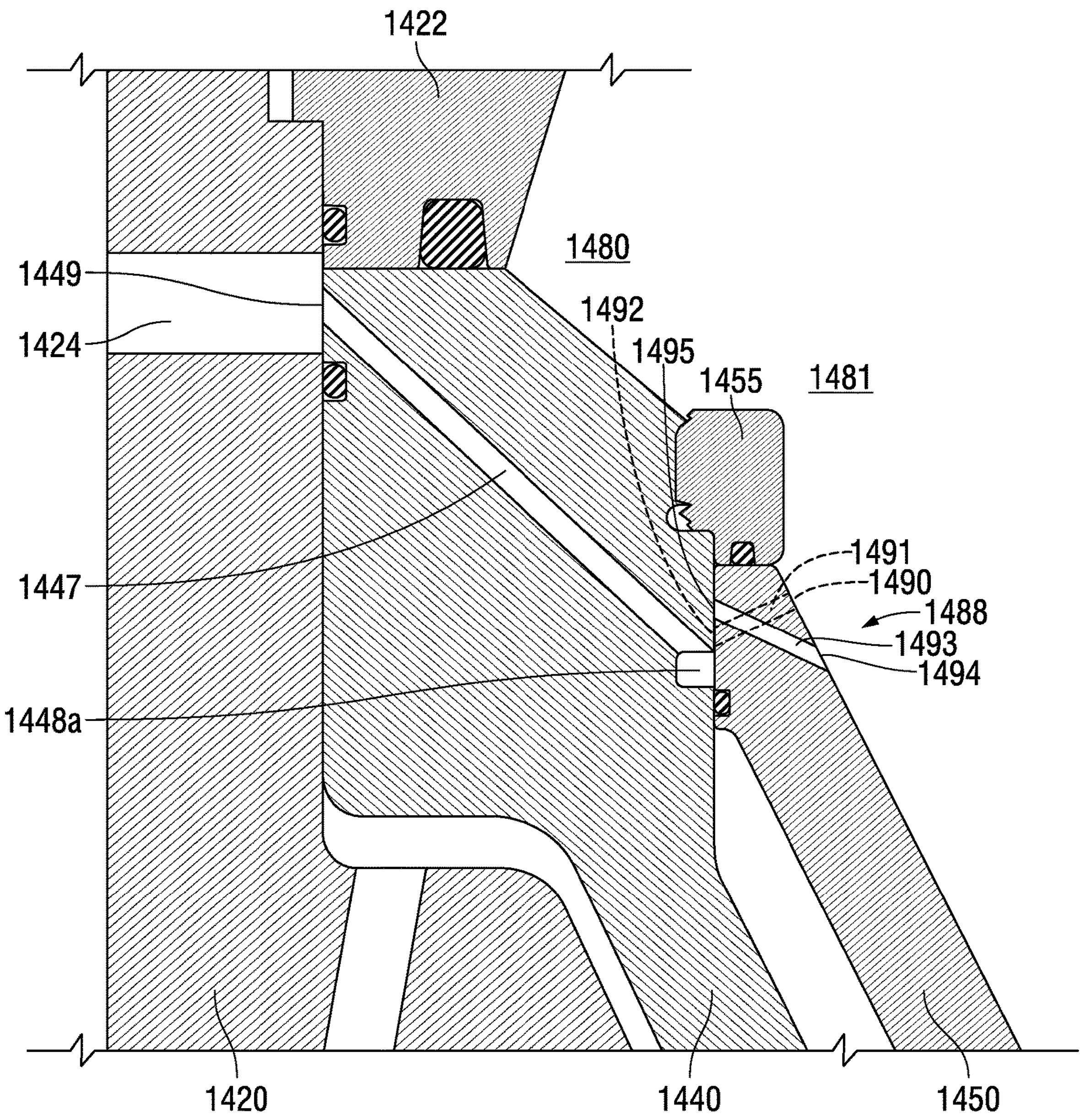
FIG. 14 is an enlarged section view similar to FIG. 9, but showing an intermediate ejection control element having an alternate arrangement of inner ejection passages.

The enlarged section view of FIG. 14 shows a portion of another centrifugal separator with an intermediate ejection path embodying the principles of the invention. This enlarged view shows the same portion of the separator as shown in FIG. 9. In particular, FIG. 14 shows a drum base 1420, drum cover 1422, drum ejection passage 1424, drum ejection passage control element 1440, intermediate ejection control element 1450, and stop ring 1455. These elements correspond, respectively, to the drum base 120, drum cover 122, drum ejection passage 124, drum ejection passage control element 140, intermediate ejection control element 150, and stop ring 155 of separator 100 shown in FIGS. 1-5 and 7. FIG. 14 also shows that the alternate separator includes a middle ejection passage 1447 which corresponds to the middle ejection passage 147 shown the embodiment of FIGS. 1-5 and 7. Middle ejection passage 1447 extends from an outlet 1449 to an inlet which terminates in a groove 1448*a* corresponding to the groove 848*a* in the embodiment of FIGS. 8-13. The alternate separator depicted in FIG. 14 also defines a maximum diameter region 1480 and an intermediate region 1481 within the separator volume corresponding to maximum diameter region 180 and intermediate region 181 described above in connection with separator 100 and shown in FIG. 3 for example. It will be appreciated that the remainder of the separator of which a portion is shown in FIG. 14 may correspond to the separator described in connection with FIGS. 1-7 or the separator described in connection with FIGS. 8-13.

The separator including the portion shown in FIG. 14 includes a different set of inner ejection passages 1488 as compared to the set of inner ejection passages 888 described above in connection with separator 800 and shown best in the similarly enlarged view of FIG. 9. The set of inner ejection passages 1488 in the embodiment of FIG. 14 includes two separate inner ejection passages, a first inner ejection passage 1490 and a second inner ejection passage 1493. First inner ejection passage 1490 formed through intermediate ejection control element 1450 includes an inlet 1491 and an outlet 1492 while second inner ejection passage 1493 through intermediate ejection control element 1450 includes an inlet 1494 and an outlet 1495. Unlike the inner ejection passages included in the set of inner ejection passages 888 shown best in FIG. 9, first inner ejection passage 1490 and second inner ejection passage 1493 are at opposite angles with respect to the separator rotational axis (the axis not shown in FIG. 14 due to the scale of the drawing, but would comprise a vertical line in the orientation of the drawing located to the right of the structure shown in FIG. 14). Also, first inner ejection passage 1490 and second inner ejection passage 1493 in FIG. 14 are positioned within intermediate ejection control element 1450 so that their paths cross but are in different planes so that they do not intersect.

In the configuration of inner ejection passages 1490 and 1493 shown in FIG. 14, first inner ejection passage inlet 1491 is located radially outwardly of second inner ejection passage inlet 1494. Thus first and second inner ejection passages 1490 and 1493 are positioned to provide a portion of an ejection path from different locations within intermediate region 1481. In operation of the separator, as intermediate ejection control element 1450 in FIG. 14 is moved downwardly from the closed position shown in the figure, the outlet 1492 of first inner ejection passage 1490 will eventually intersect with groove 1448*a* so that a continuous intermediate ejection path is formed from inlet 1491, through first inner ejection passage 1490 and middle ejection passage 1447, and finally through drum ejection passage 1424. This intermediate ejection path allows material collected in the separator volume at the radius of inlet 1491

(with respect to the separator rotational axis) and inward of that radius to be ejected from the separator volume. This includes material collected in intermediate region 1481. As intermediate ejection control element 1450 in FIG. 14 is moved further downwardly from the position in which first inner ejection passage 1490 intersects with groove 1448*a*, the outlet 1495 of second inner ejection passage 1490 will eventually intersect with groove 1448*a* so that a second continuous intermediate ejection path is formed from inlet 1494, through second inner ejection passage 1493 and middle ejection passage 1447, and finally through drum ejection passage 1424. This intermediate ejection path allows material collected in the separator volume at the radius of inlet 1494 (with respect to the separator rotational axis) and inward of that radius to be ejected from the separator volume, including material collected in intermediate region 1481. Of course, material radially outward from inlet 1494 with respect to the rotational axis of the separator would not enter inlet 1494 when inner ejection passage 1493 is open to groove 1448*a* and middle passage 1447. Similarly to the arrangement shown in the embodiment of FIGS. 8-13, the embodiment depicted in FIG. 14 may be configured so that intermediate ejection control element 1450 may be lowered further so that the upper edge of the intermediate ejection control element is at least partially below the level of groove 1448*a* to provide a third intermediate ejection path from the separator volume. This third path extends from groove 1448*a* through middle ejection passage 1447 and drum ejection passage 1424.

Figure 15:
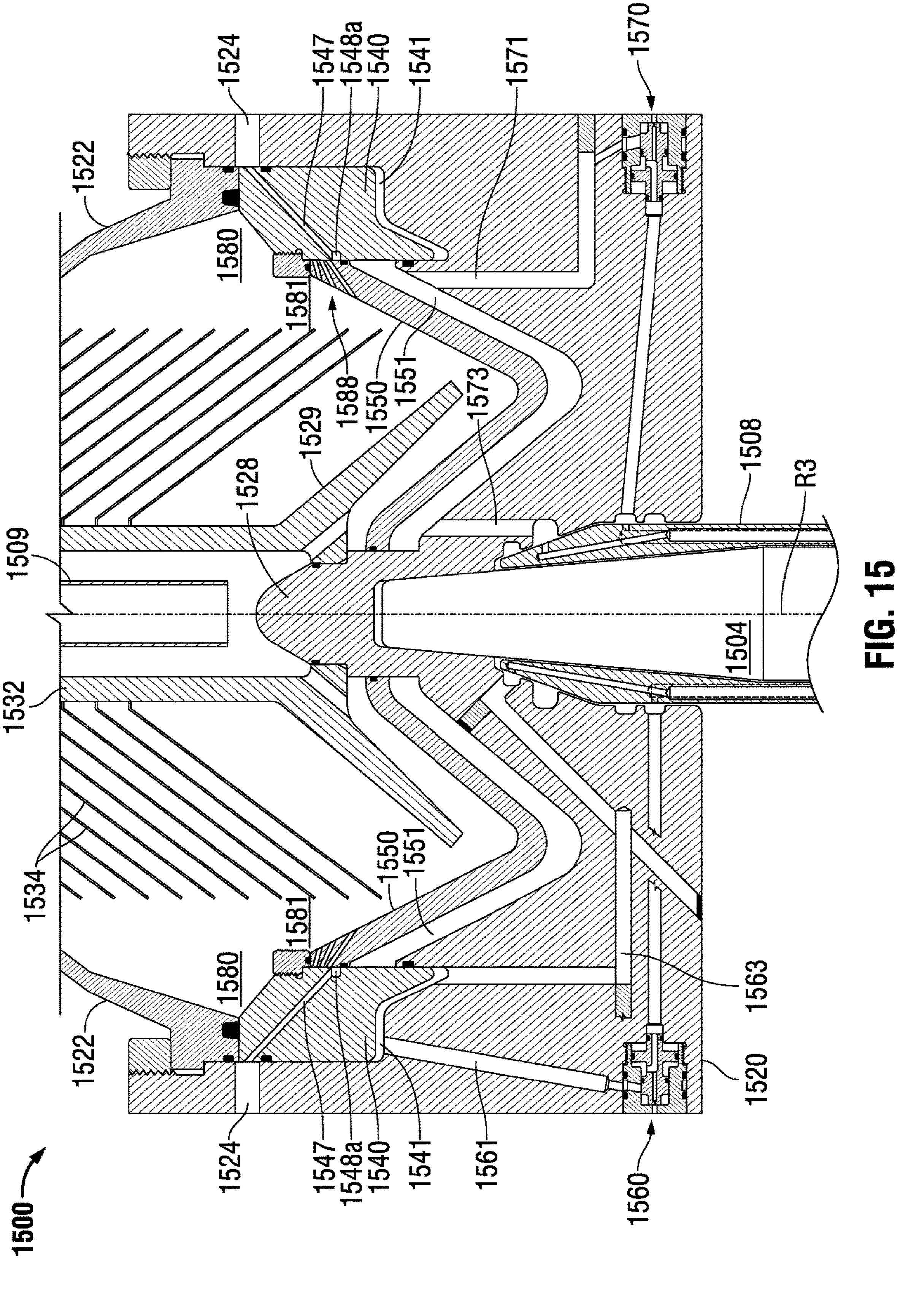
FIG. 15 is a view in section similar to FIGS. 3 and 8, but showing a portion of another example separator embodying the principles of the invention with an alternative drum ejection passage control element.

FIG. 15 shows a portion of another separator 1500 providing an intermediate ejection path in accordance with the present invention. Similarly to the section views of FIGS. 3 and 8 for example, FIG. 15 shows a spindle 1504, spindle sleeve 1508, feed tube 1509, hub 1528, distributor 1529, disk carrier 1532, and separator disks 1534. These components correspond respectively to the spindle sleeve 108, feed tube 109, hub 128, distributor 129, disk carrier 132, and separator disks 134 shown in the embodiment of FIG. 3. FIG. 15 also shows that separator 1500 includes a drum base 1520, drum cover 1522, and drum ejection passages 1524, which correspond respectively to the drum base 120, drum cover 122, and ejection passages 124 shown in the embodiment of FIG. 3.

Unlike the previously described embodiments, separator 1500 includes a drum ejection passage control element 1540 which provides the same function as the previously described drum ejection passage control elements (drum ejection passage control element 140 in FIG. 3, for example), but is truncated so that it does not extend inwardly to hub 1528. Truncated drum ejection passage control element 1540 is adapted to move between a closed position shown in FIG. 15 in which it blocks drum ejection passages 1524, to an open position in which it is shifted downwardly from the position shown in FIG. 15. It will be appreciated that in this open position, drum ejection passages 1524 are exposed to the separator volume so that material collected in the separator volume is ejected under centrifugal force as the drum assembly is rotated about axis R3. Placing truncated drum ejection passage control element 1540 in the open position thus allows material collected in the maximum diameter region 1580 to be ejected from the separator volume.

The truncated nature of drum ejection passage control element 1540 in FIG. 15 allows the drum ejection passage control element positioning chamber 1541 to encompass a much lower volume as compared to drum ejection passage control element positioning chamber 141 shown in the embodiment of FIG. 3 for example. Thus in the embodiment of FIG. 15, a lower volume of positioning fluid is required to move drum ejection passage control element 1540 along its range of movement as compared to the volume of positioning fluid required to move drum ejection passage control element 140 in FIG. 3. The truncated nature of drum ejection passage control element 1540 also allows the separator 1500 to dispense with a fill passage and release passage through the drum ejection passage control element, such as passages 144 and 146, respectively, in FIG. 3. Rather, separator 1500 includes intermediate ejection control element fill passage 1573 and intermediate ejection control element release passage 1571 both through drum base 1520. It will be noted that the embodiment of FIG. 15 includes a drum ejection passage control element release passage 1561 corresponding to release passage 161 in the embodiment of FIG. 3. The release of fluid from drum ejection passage control element release passage is controlled through a drum ejection passage control element control valve 1560 which corresponds to valve 160 in FIG. 3. The embodiment of FIG. 15 also includes a drum ejection passage control element fill passage 1563 similar to fill passage 163 in the embodiment of FIG. 3. However, drum ejection passage control element fill passage 1563 is actually made up of a system of different passages bored through drum base 1520 to provide the flow path needed to reach drum ejection passage control element positioning chamber 1541.

The embodiment of FIG. 15 includes an intermediate ejection control element 1550 and an intermediate ejection control element positioning chamber 1551 corresponding to intermediate ejection control element 150 and intermediate ejection control element positioning chamber 151 shown in the embodiment of FIG. 3. The position of intermediate ejection control element 1550 along its range of movement is controlled through an intermediate ejection control element control valve 1570 which corresponds to valve 170 in FIG. 3 for example. Intermediate ejection control element 1550 includes a set 1588 of inner ejection passages similar to the set 888 shown in the embodiment of FIG. 8. It will be appreciated that the embodiment of FIG. 15 is not limited to this arrangement of inner ejection passages. Other forms of a separator including a truncated drum ejection passage control element such as control element 1540 may include no inner ejection passages through the intermediate ejection control element (similar to control element 150 shown in FIG. 3) or may include a different set of inner ejection passages (such as the crossed passage set 1488 shown in the example of FIG. 14). Also, it should be noted that the intermediate ejection control element in a separator according to the present invention (or further control elements in embodiments with more than two) may be truncated similarly to drum ejection passage control element 1540. In these embodiments the second or other control element would slide along its range of movement in a suitable annularly shaped cylinder formed in the drum base.

The embodiment of FIG. 15 provides intermediate ejection paths which include a middle ejection passage 1547 through the truncated drum ejection passage control element 1540 and terminating at an inlet comprising groove 1548*a*. This arrangement is similar to that shown in the embodiments of FIGS. 1-7 and 8-13. In these arrangements, the middle ejection passage 147, 847, and 1547 of the embodiments of FIGS. 1-7, 8-13, and 15, respectively, forms part of the intermediate ejection path through which material may be ejected from the intermediate region of the separator volume. This material ejected from the intermediate region of the separator volume ultimately exits the drum assembly via the drum ejection passages formed in the drum base, namely passages 124 in the embodiment of FIGS. 107, 824 in the embodiment of FIGS. 8-13, and 1524 in the embodiment of FIG. 15. However, as will be discussed further below in connection with FIGS. 16-17, embodiments in accordance with the present invention may provide intermediate ejection paths which do not extend through any part of the drum ejection passage control element and which do not rely on the same drum ejection passages employed for ejecting material from the maximum diameter region of the separator volume.

Figure 16:
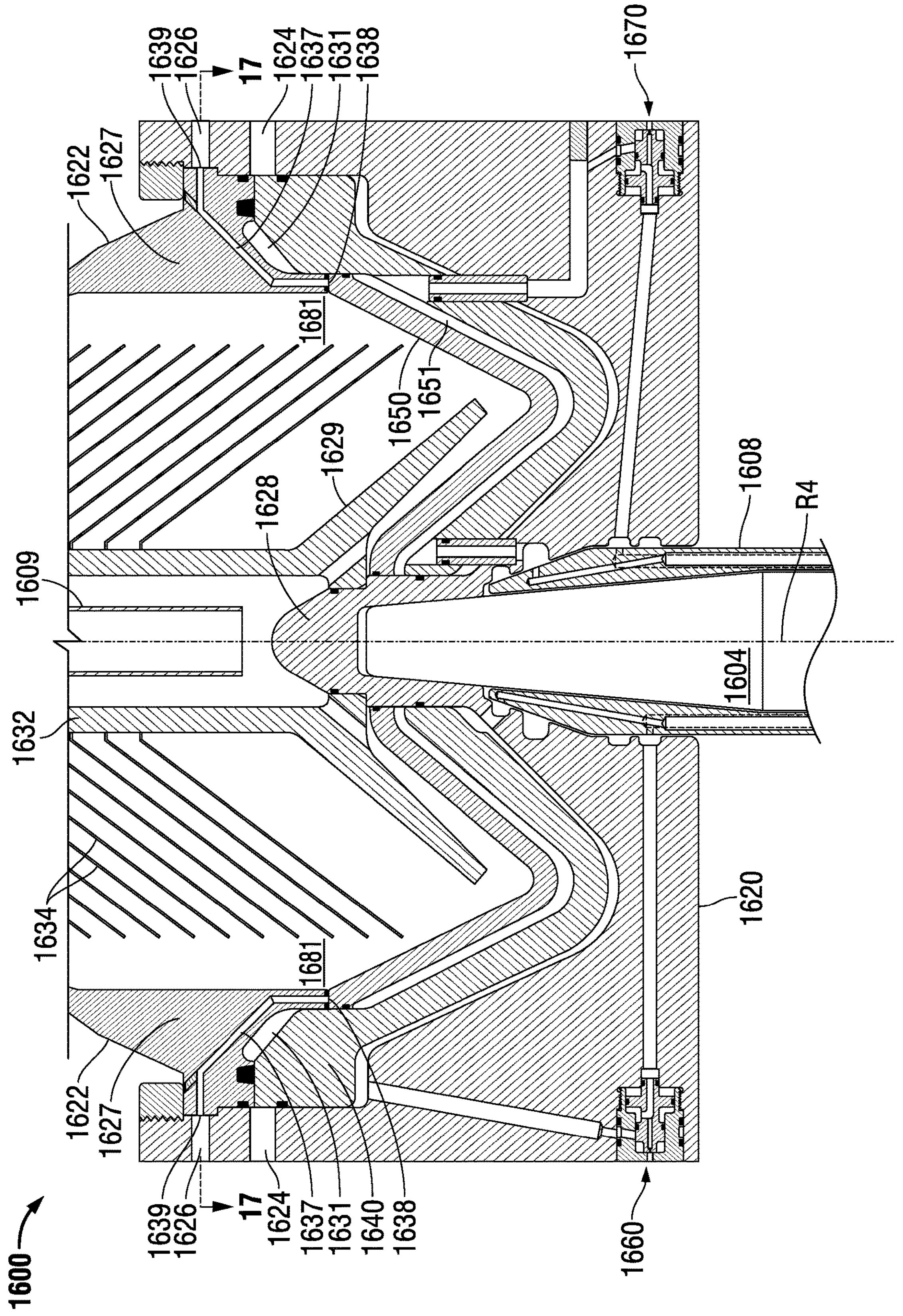
FIG. 16 is a view in section similar to FIGS. 3, 8, and 15, but showing a portion of an additional example separator embodying the principles of the invention.
Figure 17:
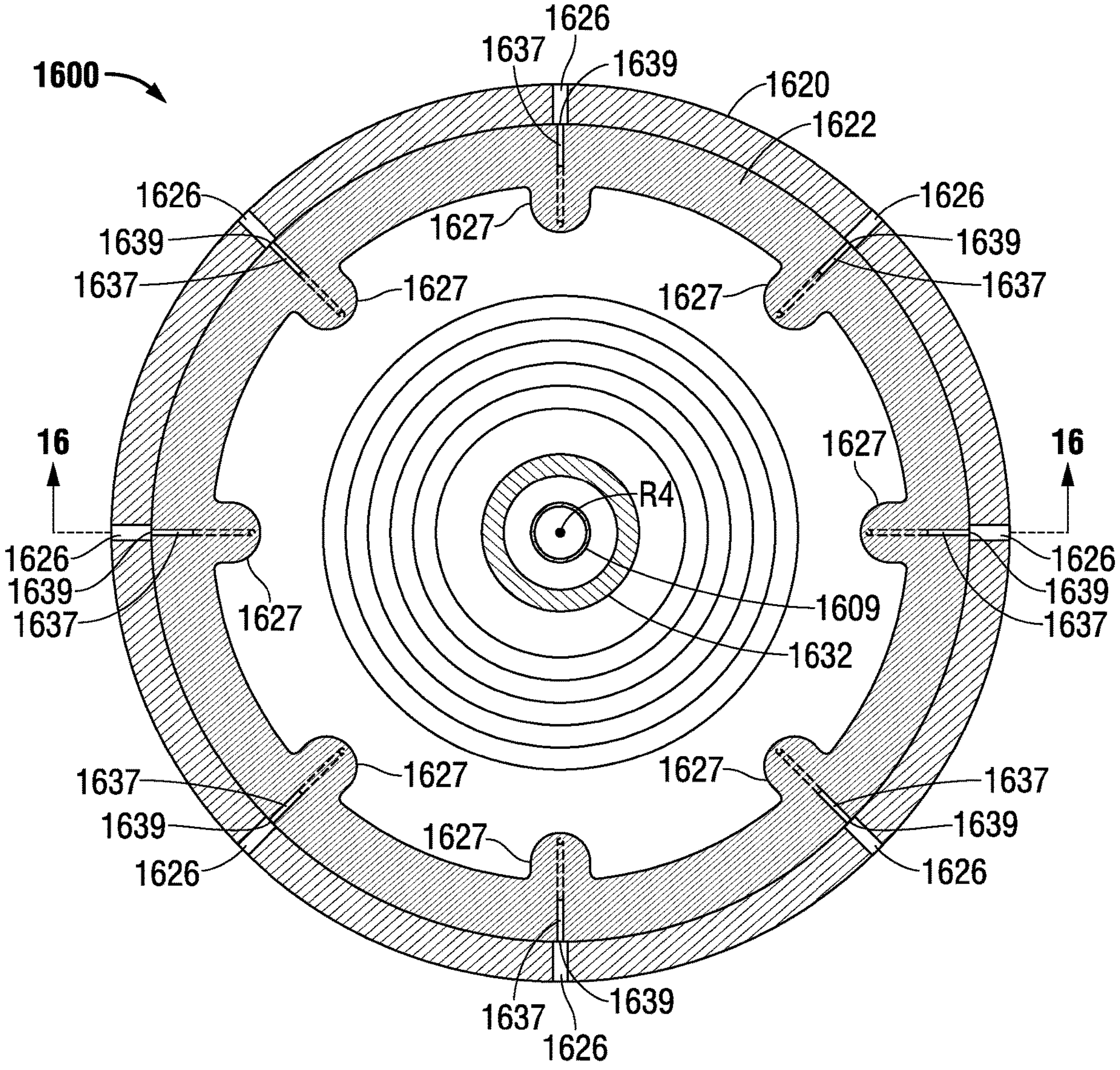
FIG. 17 is a view in horizontal section taken along line 17-17 in FIG. 16, and showing at line 16-16 the position of the section shown in FIG. 16.

The section views of FIGS. 16 and 17 show another alternate separator 1600 in accordance with the present invention. Similarly to the previously described embodiments, separator 1600 employs a control element to selectively open intermediate ejections paths which allow material collected in an intermediate region of the separator volume to be ejected separately from any ejection of material at the maximum diameter region of the separator volume. However, the intermediate ejection paths of the separator 1600 shown in FIGS. 16 and 17 do not pass through a drum ejection passage control element. Rather, the intermediate ejections paths are formed exclusively through parts of the drum assembly of separator 1600.

The vertical section view of FIG. 16 shows a portion of separator 1600 similar to the section view of FIG. 3 for example. As such, FIG. 16 shows that separator 1600 includes a spindle 1604, spindle sleeve 1608, feed tube 1609, hub 1628, distributor 1629, disk carrier 1632, and separator disks 1634. These components correspond respectively to the spindle 104, spindle sleeve 108, feed tube 109, hub 128, distributor 129, disk carrier 132, and separator disks 134 shown in the embodiment of FIG. 3. FIG. 16 also shows that separator 1600 includes a drum base 1620, drum cover 1622, drum ejection passage control element 1640, and intermediate ejection control element 1650, which correspond respectively to the drum base 120, drum cover 122, drum ejection passage control element 140, and intermediate ejection control element 150 shown in the embodiment of FIG. 3. The position of drum ejection passage control element 1640 is controlled through a drum ejection passage control element control valve 1660 corresponding to valve 160 in FIG. 3, and the position of intermediate ejection control element 1650 is controlled through an intermediate ejection control element control valve 1670 corresponding to control valve 170 in FIG. 3. However, in order to provide an intermediate ejection path that does not pass through drum ejection passage control element 1640, separator 1600 includes vertical ridges 1627 shown in FIGS. 16 and 17. As best shown in the horizontal section view of FIG. 17, these vertical ridges 1627 are spaced apart about drum cover 1622 and project inwards toward the separator axis of rotation R4. In the illustrated embodiment, each vertical ridge 1627 includes a drum cover passage 1637. The vertical section view of FIG. 16 shows that each drum cover passage 1637 extends from an inlet 1638 to an outlet 1639 which opens to a respective intermediate drum ejection passage 1626 formed in drum base 1620. In the closed position of intermediate ejection control element 1650 shown in FIG. 16, with the intermediate ejection control element at the uppermost end of its range of travel, a surface of intermediate ejection control element 1650 covers and blocks the respective inlet 1638 of each drum cover passage 1637. However, when intermediate ejection control element 1650 is lowered from the position shown in FIG. 16, inlet 1638 is open to the separator volume and particularly the intermediate region 1681 of the separator volume. This provides a continuous flow path through drum cover passage 1637 and respective intermediate drum ejection passage 1626, to allow material collected in intermediate region 1681 to be ejected from the separator volume under the centrifugal force generated as the drum assembly spins about rotational axis R4.

The section view of FIG. 16 also shows that each vertical ridge 1627 includes a cutout area 1631 which forms part of the separator volume and particularly part of the separator volume at the maximum diameter region. Thus when drum ejection passage control element 1640 is lowered from the closed position shown in FIG. 16, the control element opens a gap corresponding to gap 184 in FIG. 4 to allow material collected in the separator volume, and particularly material collected in maximum diameter region to be ejected from the separator volume through drum ejection passages 1624. It should be noted that because the intermediate ejection control element positioning chamber 1651 in this embodiment is formed between the top of drum ejection passage control element 1640 and the bottom surface of intermediate ejection control element 1650, lowering drum ejection passage control element 1640 to its open position would also lower intermediate ejection control element 1650 to its open position unless additional positioning fluid is introduced into intermediate ejection control element positioning chamber 1651 while the drum ejection passage control element 1640 is lowered. Thus if it is desired in the operation of separator 1600 to eject only material from the maximum diameter region of the separator volume, additional positioning fluid will be directed to intermediate ejection control element positioning chamber 1651 to maintain intermediate ejection control element 1650 in the position shown in FIG. 16 blocking drum cover passages 1637. This situation in which lowering drum ejection passage control element 1640 to its open position also moves intermediate ejection control element 1650 to its open position is dissimilar to the situation in the other illustrated embodiments. In the embodiment shown in FIG. 3 for example, lowering drum ejection passage control element 140 from its closed to open position does cause intermediate ejection control element 150 to move downwardly within drum assembly 102, but this movement of intermediate ejection control element 150 relative to the drum assembly does not result in exposing middle passage 147 to the separator volume and thus does not move intermediate ejection control element 150 from its closed to open position.

It should be appreciated that the separators described in connection with the drawings are merely examples of the use of an intermediate ejection control element to facilitate the ejection of material from an intermediate region of the separator volume. Numerous variations are possible within the scope of the present invention as set out in the following claims. One such variation relates to the drum ejection passages such as passages 124 and 824 in the example separators. In these examples, these drum ejection passages are used both in connection with ejection from the maximum diameter region of the separator volume and from the intermediate region. In alternate forms of a separator within the scope of the present invention, different sets of passages may be provided in the drum assembly. One set may be located similarly to passages 124 in FIG. 2 for facilitating the ejection of material from the maximum diameter region and another set of ejection passages may be provided for ejecting material from the intermediate region of the separator volume. Such an arrangement is shown in the example of FIG. 16 with separate intermediate drum ejection passaged 1626. However, such additional drum ejection passages need not be formed in the drum base as shown in that example.

Other variations include variations in the configurations of the multiple control elements provided in the drum assembly volume. Is some embodiments within the scope of the present invention, the control element in the position of the intermediate ejection control element may be configured to block or unblock the drum ejection passages located at the region of maximum diameter. The control element in the position of the drum ejection passage control element shown in the above examples may be configured be moved relative to the intermediate ejection control element to align middle passages of the drum ejection passage control element with inner passages of the intermediate ejection control element so as to provide ejection routes from the intermediate region of the separator volume. Furthermore, although the examples described above include two different control elements, the present invention is not limited to this number of control elements. One or more control elements beyond the intermediate ejection control element as described above may be included in a separator in accordance with the present invention to control additional ejection routes from the separator volume.

Further variations on the illustrated example embodiments include variations in the number of inner ejection passages such as the passages shown in set 888 shown in the embodiment of FIGS. 8-13 and set 1488 in the embodiment of FIG. 14. In particular, although the example set 888 includes three inner ejection passages and example set 1488 includes two inner ejection passages, the invention is not limited to these numbers of ejection passages. Any number of ejection passages may be included in a set of such passages to facilitate removal of intermediate-density material from different radii across the intermediate region of a given separator.

Variations on the illustrated embodiments may also involve the orientation of the middle passages of the drum ejection passage control element and inner passages of the intermediate ejection control element. For example, although the section views of the example separators show that the middle passages and inner passages all extend radially from the axis of rotation of the separator, this may not be the case in other embodiments. In other separators in accordance with the present invention, the middle passages of the drum ejection passage control element may extend at an angle to a radial line projecting from the separator axis of rotation, either toward the direction of rotation or way from the direction of rotation. That is, such passages may be swept forward or backward with respect to the direction of rotation about the separator rotational axis.

It should also be appreciated that the control valves such as valves 160 and 170 in the embodiment of FIGS. 1-7 are provided merely as examples of valves which may be operated to control the release of positioning fluid from the respective positioning chambers. Other valves may be used to perform this function. Also, any number of arrangements may be provided to selectively direct positioning fluid to the positioning chambers. In yet other embodiments within the scope of the present invention, alternative control element positioning arrangements may be employed to control the position of the control elements along their respective range of movement. Although systems such as those described above which use a positioning fluid and positioning chambers to control the position of the control element are preferred in view of their relative simplicity, any arrangements may be used to control the position of the control elements in accordance with the present invention. In particular, actuators which do not rely on the use of positioning fluids may be used to control the position of control elements in a separator embodying the principles of the invention.

The example separators described above all comprise non-hermetically sealed separators in which the feed stream is introduced from the top of the drum assembly. The invention is, however, not limited to non-hermetically sealed separators or to top-feed separators. Rather, implementations of the present invention including intermediate ejections paths may include either non-hermetically sealed or hermetically sealed separators, and include separators in which the feed stream is introduced from the top of the drum assembly and separators in which the feed stream is introduced from the bottom of the drum assembly.

As used herein, whether in the above description or the following claims, the terms "comprising," "including," "carrying," "having," "containing," "involving," and the like are to be understood to be open-ended, that is, to mean including but not limited to. Also, it should be understood that the terms "about," "substantially," and like terms used herein when referring to a dimension or characteristic of a component indicate that the described dimension/characteristic is not a strict boundary or parameter and does not exclude variations therefrom that are functionally similar. At a minimum, such references that include a numerical parameter would include variations that, using mathematical and industrial principles accepted in the art (e.g., rounding, measurement or other systematic errors, manufacturing tolerances, etc.), would not vary the least significant digit.

Any use of ordinal terms such as "first," "second," "third," etc., in the following claims to modify a claim element does not by itself connote any priority, precedence, or order of one claim element over another, or the temporal order in which acts of a method are performed. Rather, unless specifically stated otherwise, such ordinal terms are used merely as labels to distinguish one claim element having a certain name from another element having a same name (but for use of the ordinal term).

In the above descriptions and the following claims, terms such as top, bottom, upper, lower, above, below, and the like with reference to orientation of the device shown in the drawings.

The term "each" may be used in the following claims for convenience in describing characteristics or features of multiple elements, and any such use of the term "each" is in the inclusive sense unless specifically stated otherwise. For example, if a claim defines two or more elements as "each" having a characteristic or feature, the use of the term "each" is not intended to exclude from the claim scope a situation having a third one of the elements which does not have the defined characteristic or feature. For a more specific example, a claim that each of a number of inner ejection passages aligns with a respective one of a number of middle ejection passages is not intended to exclude the situation where an additional one of the inner ejection passages is provided but does not align with a respective middle ejection passage. For another specific example, a claim that each of a number of middle ejection passages aligns with a respective one of a number of drum ejection passages is not intended to exclude the situation where an additional one of the middle ejection passages is provided but does not align with a drum ejection passage. These specific examples are simply examples and are not intended to be limiting.

The above-described preferred embodiments are intended to illustrate the principles of the invention, but not to limit the scope of the invention. Various other embodiments and modifications to these preferred embodiments may be made by those skilled in the art without departing from the scope of the present invention. For example, in some instances, one or more features disclosed in connection with one embodiment can be used alone or in combination with one or more features of one or more other embodiments. More generally, the various features described herein may be used in any working combination.

The invention claimed is:

1. An apparatus including:

(a) a drum assembly defining a separator rotational axis and including a separator volume in fluid communication with a feed inlet to the separator volume;

(b) a drum ejection passage included in the drum assembly, the drum ejection passage extending from a drum ejection passage inlet to a drum ejection passage outlet, the drum ejection passage inlet being at a first radial distance from the separator rotational axis;

(c) a drum ejection passage control element mounted on the drum assembly for movement between a first drum ejection passage control position and a second drum ejection passage control position, wherein in the first drum ejection passage control position the drum ejection passage control element is positioned relative to the drum ejection passage to define a first flow area through the drum ejection passage from the separator volume to an area outside the separator volume and wherein in the second drum ejection passage control position the drum ejection passage control element is positioned relative to the drum ejection passage to define a second flow area through the drum ejection passage greater than the first flow area through the drum ejection passage;

(d) an intermediate ejection path included in the drum assembly, the intermediate ejection path extending from an intermediate ejection path inlet to an intermediate ejection path outlet, the intermediate ejection path inlet being located at second radial distance from the separator rotational axis less than the first radial distance; and (e) an intermediate ejection control element mounted on the drum assembly for movement between a first intermediate ejection control position and a second intermediate ejection control position, wherein in the first intermediate ejection control position the intermediate ejection control element is positioned relative to the intermediate ejection path to define a first flow area through the intermediate ejection path and wherein in the second intermediate ejection control position the intermediate ejection control element is positioned relative to the intermediate ejection path to define a second flow area through the intermediate ejection path greater than the first flow area through the intermediate ejection path.

2. The apparatus of claim 1 wherein the intermediate ejection path is defined at least in part by a middle ejection passage formed in the drum ejection passage control element, the middle ejection passage having a middle passage inlet at an inside surface of the drum ejection control element and having a middle passage outlet at an outside surface of the drum ejection control element.

3. The apparatus of claim 2 wherein an upper lateral surface of the intermediate ejection control element covers the middle passage inlet when the intermediate ejection control element is in the first intermediate ejection control position and is displaced at least partially from the middle passage inlet when the intermediate ejection control element in the second intermediate ejection control position so as to expose the middle passage inlet to the separator volume.

4. The apparatus of claim 2 wherein:

(a) the intermediate ejection path includes an inner ejection passage having an inner ejection inlet at an inside surface of the intermediate ejection control element and having an inner ejection outlet at an outside surface of the intermediate ejection control element; and (b) the inner ejection outlet of the inner ejection passage at least partially aligns with the middle passage inlet of the middle ejection passage when the intermediate ejection control element is in the second intermediate ejection control position so as to expose the middle passage inlet to the separator volume through the inner ejection passage.

5. The apparatus of claim 2 wherein:

(a) the intermediate ejection control element includes a set of two or more inner ejection passages, each of the inner ejection passages having a respective inner ejection passage inlet at an inside surface of the intermediate ejection control element and a respective inner ejection passage outlet at an outside surface of the intermediate ejection control element;

(b) the inner ejection passage outlet of a first inner ejection passage included in the set of inner ejection passages at least partially aligns with the middle passage inlet when the intermediate ejection control element is in the second intermediate ejection control position so as to expose the middle passage inlet to the separator volume through first inner ejection passage;

(c) the intermediate ejection control element range of movement between the first intermediate ejection control position and the second intermediate ejection control position encompasses a respective additional intermediate ejection control position corresponding to each inner ejection passage in the set of inner ejection passages beyond the first inner ejection passage; and (d) the inner ejection passage outlet of a respective inner ejection passage of the set of inner ejection passages beyond the first inner ejection passage at least partially aligns with the middle passage inlet when the intermediate ejection control element is in a respective additional intermediate ejection control position corresponding to that inner ejection passage so as to expose the middle passage inlet to the separator volume through the respective inner ejection passage.

6. The apparatus of claim 5 wherein each respective inner ejection passage of the set of inner ejection passages extends at a respective angle to a plane extending perpendicular to the separator rotational axis, each respective angle being different from each other respective angle.

7. The apparatus of claim 5 wherein:

(a) the set of inner ejection passages includes the first inner ejection passage and a second inner ejection passage;

(a) the first inner ejection passage extends downwardly in the direction from the inlet of the first inner ejection passage to the outlet of the first inner ejection passage; and (b) the second inner ejection passage extends upwardly in the direction from the inlet of the second inner ejection passage to the outlet of the second inner ejection passage.

8. The apparatus of claim 1 wherein the drum assembly defines a drum assembly volume that includes the separator volume and wherein the drum ejection passage control element is mounted on the drum assembly within the drum assembly volume.

9. The apparatus of claim 8 wherein the intermediate ejection control element is mounted on the drum assembly within the drum assembly volume.

10. The apparatus of claim 9 further including:

(a) at least one intermediate ejection control element positioning chamber fill passage in the drum ejection passage control element, the at least one intermediate ejection control element positioning chamber fill passage being sealed from the separator volume at all positions of the intermediate ejection control element along an intermediate ejection control element range of movement; and (b) at least one intermediate ejection control element positioning chamber release passage in the drum ejection passage control element, the at least one intermediate ejection control element positioning chamber release passage being sealed from the separator volume at all positions of the intermediate ejection control element along the intermediate ejection control element range of movement.

11. A method including:

(a) rotating a drum assembly of a centrifugal separator at a separator velocity about a separator rotational axis, the drum assembly including a separator volume in fluid communication with a feed inlet to the separator volume and further including a drum ejection passage, the centrifugal separator further including a drum ejection passage control element mounted on the drum assembly for movement between a first drum ejection passage control position and a second drum ejection passage control position, wherein in the first drum ejection passage control position the drum ejection passage control element is positioned relative to the drum ejection passage to define a first flow area through the drum ejection passage from the separator volume to an area outside the separator volume and wherein in the second drum ejection passage control position the drum ejection passage control element is positioned relative to the drum ejection passage to define a second flow area through the drum ejection passage greater than the first flow area through the drum ejection passage to enable material from a maximum diameter of the separator volume to be ejected from the separator volume through the drum ejection passage when the drum ejection passage control element is in the second drum ejection passage control position;

(b) while rotating the drum assembly at the separator velocity, moving an intermediate ejection control element mounted on the drum assembly from a first intermediate ejection control position to a second intermediate ejection control position relative to an intermediate ejection path included in the drum assembly, the intermediate ejection path extending from an intermediate ejection path inlet which is radially inward of the maximum diameter of the separator volume to an intermediate ejection path outlet, wherein in the first intermediate ejection control position the intermediate ejection control element is positioned relative to the intermediate ejection path to define a first flow area through the intermediate ejection path and wherein in the second intermediate ejection control position the intermediate ejection control element is positioned relative to the intermediate ejection path to define a second flow area through the intermediate ejection path greater than the first flow area through the intermediate ejection path; and (c) while rotating the drum assembly at the separator velocity, returning the intermediate ejection control element from the second intermediate ejection control position to the first intermediate ejection control position.

12. The method of claim 11 further including maintaining the drum ejection passage control element in the first drum ejection passage control position while moving the intermediate ejection control element from the first intermediate ejection control position to the second intermediate ejection control position and while returning the intermediate ejection control element from the second intermediate ejection control position to the first intermediate ejection control position.

13. The method of claim 11 wherein:

(a) the drum ejection passage control element includes a middle ejection passage, the middle ejection passage forming part of the intermediate ejection path; and (b) moving the intermediate ejection control element from the first intermediate ejection control position to the second intermediate ejection control position includes moving the intermediate ejection control element from a position in which the intermediate ejection control element blocks the middle ejection passage to a position in which the middle ejection passage is open to the separator volume.

14. The method of claim 13 wherein an upper lateral surface of the intermediate ejection control element covers the middle passage inlet of the middle ejection passage when the intermediate ejection control element is in the first intermediate ejection control position and is displaced at least partially from the middle passage inlet when the intermediate ejection control element is in the second intermediate ejection control position.

15. The method of claim 11 wherein moving the intermediate ejection control element from the first intermediate ejection control position to the second intermediate ejection control position includes releasing a positioning fluid for the intermediate ejection control element through a fluid release passage through the drum ejection passage control element.

16. The method of claim 15 wherein moving the intermediate ejection control element from the first intermediate ejection control position to the second intermediate ejection control position includes releasing the positioning fluid through an intermediate ejection control element control valve in fluid communication with the fluid release passage.

17. The method of claim 11 wherein returning the intermediate ejection control element from the second intermediate ejection control position to the first intermediate ejection control position includes directing a positioning fluid through a fill passage through the drum ejection passage control element.

18. The method of claim 11 wherein the intermediate ejection path includes an inner ejection passage extending through the intermediate ejection control element.

19. The method of claim 11 wherein:

(a) the intermediate ejection control element includes a set of two or more inner ejection passages for the intermediate ejection path; and (b) moving the intermediate ejection control element to the second intermediate ejection control position includes moving the intermediate ejection control element to a position in which a first one of the inner ejection passages of the set of inner ejection passages forms part of the intermediate ejection path.

20. The method of claim 19 wherein moving the intermediate ejection control element to the second intermediate ejection control position includes moving the intermediate ejection control element to a position in which a second one of the two or more inner ejection passages of the set of inner ejection passages forms part of the intermediate ejection path.

* * * * *